United States Patent
Liu et al.

(10) Patent No.: US 9,172,464 B2
(45) Date of Patent: Oct. 27, 2015

(54) HANDSHAKE SYNCHRONIZATION METHOD AND SYSTEM BASED ON VISIBLE LIGHT COMMUNICATION

(71) Applicant: KUANG-CHI INNOVATIVE TECHNOLOGY LTD., Shenzhen (CN)

(72) Inventors: Ruopeng Liu, Shenzhen (CN); Lin Luan, Shenzhen (CN); Guangjin Xiao, Shenzhen (CN)

(73) Assignee: KUANG-CHI INNOVATIVE TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 14/405,787

(22) PCT Filed: May 7, 2013

(86) PCT No.: PCT/CN2013/075281
§ 371 (c)(1),
(2) Date: Dec. 5, 2014

(87) PCT Pub. No.: WO2013/181980
PCT Pub. Date: Dec. 12, 2013

(65) Prior Publication Data
US 2015/0155936 A1 Jun. 4, 2015

(30) Foreign Application Priority Data

Jun. 6, 2012 (CN) .......................... 2012 1 0184610
Jun. 20, 2012 (CN) .......................... 2012 1 0205400
Jun. 29, 2012 (CN) .......................... 2012 1 0222257

(51) Int. Cl.
*H04B 10/116* (2013.01)
*H04L 7/00* (2006.01)
*H04L 9/08* (2006.01)

(52) U.S. Cl.
CPC ............ *H04B 10/116* (2013.01); *H04L 7/0075* (2013.01); *H04L 9/0869* (2013.01); *H04L 2209/80* (2013.01)

(58) Field of Classification Search
CPC    H04B 10/116; H04L 9/0869; H04L 2209/80; H04L 7/0075
USPC .......................... 380/256; 398/37, 67, 79, 173
See application file for complete search history.

(56) References Cited

U.S. PATENT DOCUMENTS 3,566,128 A * 2/1971 Arnaud ............................ 398/37
5,887,243 A * 3/1999 Harvey et al. .................. 725/136
(Continued)

FOREIGN PATENT DOCUMENTS

CN     102724011 A    10/2012
CN     102769524 A    11/2012
(Continued)

*Primary Examiner* — Haresh N Patel
(74) *Attorney, Agent, or Firm* — Perkins Coie LLP

(57) ABSTRACT

A handshake synchronization method and system based on visible light communication are provided. The method includes: connecting, by a transmitting end, in which a state machine varies with unit time, to a receiving end, the status of a state machine of the receiving end being synchronized with the status of the state machine of the transmitting end; using, by the transmitting end, a pseudocode signal which varies with unit time, to scramble an original signal and a pilot optical signal, and sending, in the form of a visible light signal, the scrambled signal obtained by scrambling; and receiving, by the receiving end, the visible light signal, identifying the scrambled signal of the current period of time by using a pilot optical signal, and decrypting the original signal according to the scrambled signal. Since a visible light signal which is transmitted between a transmitting end and a receiving end is not an original signal, the security of a photonic Internet of Things is improved.

15 Claims, 13 Drawing Sheets

(56) References Cited

U.S. PATENT DOCUMENTS

| | | | |
|---|---|---|---|
| 7,769,344 B1* | 8/2010 | Harvey et al. | 455/39 |
| 2002/0126351 A1* | 9/2002 | Chung et al. | 359/124 |
| 2004/0213566 A1* | 10/2004 | Takanashi et al. | 398/32 |
| 2006/0189353 A1* | 8/2006 | Fujishima | 455/561 |
| 2008/0166128 A1* | 7/2008 | Toyomaki et al. | 398/79 |
| 2009/0087194 A1* | 4/2009 | Nakashima et al. | 398/158 |
| 2009/0196603 A1* | 8/2009 | Zhou et al. | 398/32 |
| 2010/0021163 A1* | 1/2010 | Shieh | 398/65 |
| 2011/0069957 A1 | 3/2011 | Kim et al. | |
| 2012/0093522 A1* | 4/2012 | Qi et al. | 398/174 |
| 2012/0166582 A1* | 6/2012 | Binder | 709/217 |
| 2012/0207475 A1* | 8/2012 | Tian et al. | 398/65 |
| 2013/0072112 A1* | 3/2013 | Gunnarsson et al. | 455/9 |

FOREIGN PATENT DOCUMENTS

| | | |
|---|---|---|
| CN | 102780695 A | 11/2012 |
| KR | 20110012525 A | 2/2011 |
| WO | 2011034342 A2 | 3/2011 |

* cited by examiner

HANDSHAKE SYNCHRONIZATION METHOD AND SYSTEM BASED ON VISIBLE LIGHT COMMUNICATION

TECHNICAL FIELD

The disclosure relates to the field of photonic Internet of Things technologies, and in particular, to a handshake synchronization method and system based on visible light communication.

BACKGROUND

Visible light communication is an emerging and short-distance high-speed wireless optical communications technology that is developed on a basis of a light emitting diode (LED) technology. A basic principle of visible light communication is that communication is conducted by blinking an LED light source at a high frequency based on the characteristics that a switching speed of an LED is faster than that of a fluorescent lamp and an incandescent lamp. Presence of light indicates binary 1, and absence of light indicates binary 0. Information may be obtained after a high-speed optical signal that includes digital information undergoes photovoltaic conversion. In the wireless optical communications technology, data is unlikely to be interfered or captured, and an optical communication device can be easily made and are unlikely to be damaged or demagnetized. Therefore, the wireless optical communications technology can be used to make a wireless optical encryption key. Compared with a microwave technology, wireless optical communication has relatively rich spectrum resources, which is unmatched by common microwave communication and wireless communication. In addition, visible light communication is applicable to any communications protocol, and is suitable for any environment. In terms of security, compared with conventional magnetic materials, there is no need to worry about a problem of degaussing, or even to worry about that communication content is intercepted. Besides, optical wireless communication equipment features flexible and convenient installation and layout, and low costs, and thus is applicable to large-scale popularity and application.

The Internet of Things is a network that is based on an information carrier, such as the Internet, a conventional telecommunications network, or the like, so that all common physical objects that can be individually addressable can implement interconnection and interworking. The Internet of Things refers to that ubiquitous terminal devices and facilities implement interconnection and interworking by using various wireless or wired long-distance or short-distance communication networks to provide secure, controllable and even personalized management and service functions such as real-time online monitoring, positioning tracing, alarm linkage, scheduling and dispatching, plan management, remote control, security protection, remote maintenance, online upgrade, statistical reporting, decision-making support, and leader desktop, so as to implement integration of "management, control, and operation" of high efficiency, energy saving, security, environmental protection of devices. A conventional Internet of Things generally implements interconnection and interworking by using various wireless or wired communication networks, and adopts a conventional communications technology.

In the related art, the Internet of Things using the visible light communications technology is called the photonic Internet of Things. Visible light has higher security than wireless communication due to characteristics that visible light has high directivity, and cannot penetrate a barrier. The photonic Internet of Things uses an LED emitting a strobe signal as a media of wireless communication for the photonic Internet of Things. The so-called strobe signal, which is a pulsing modulated signal emitted by turning on and off an LED, where presence of light indicates 1, and absence of light indicates 0, after a short-distance propagation, undergoes photovoltaic conversion to obtain information. Visible light has high directivity and cannot penetrate a barrier, and therefore has higher security than the Internet of Things that uses a wireless communications manner. However, in the current photonic Internet of Things technology, original data is not encrypted, but a signal is modulated directly onto a visible light signal for transmission, or a transmitting end and a receiving end only use a fixed encryption signal (for example, a pseudocode signal) not varying with time to perform encryption. If a high-speed camera is used for shooting, a light signal with a same strobe might be replicated. Because a pseudocode signal used for decryption by the receiving end is fixed, the replicated optical signal may also be identified by the receiving end and correctly decrypted. Therefore, such encryption is useless. To sum up, the existing photonic Internet of Things has security risks.

SUMMARY

To solve the technical problem, the embodiments of the disclosure provide a handshake synchronization method and system based on visible light communication, which can improve security of a photonic Internet of Things.

One embodiment of the disclosure provides a handshake synchronization method for a visible light signal, including:

connecting, by a transmitting end in which a state machine varies with unit time, to a receiving end, and adjusting, by the receiving end, status of a state machine of the receiving end to be synchronous with status of the state machine of the transmitting end in the current period of time;

performing, by the transmitting end, a logical operation on an original signal and a pilot optical signal separately with a pseudocode signal of the current period of time to obtain an encrypted original signal and an encrypted pilot optical signal, combining the encrypted original signal and the encrypted pilot optical signal to obtain the scrambled signal, and sending the scrambled signal in the form of a visible light signal; and receiving, by the receiving end, the visible light signal, and converting the visible light signal into a digital signal and then performing decomposition to obtain an encrypted original signal and an encrypted pilot optical signal; after inverting the encrypted pilot optical signal, comparing an inverted encrypted pilot optical signal with a pseudocode signal corresponding to current status; and if the inverted encrypted pilot optical signal is the same as the pseudocode signal corresponding to the current status, using the pseudocode signal corresponding to the current status to decrypt the encrypted original signal.

In the described embodiment, the state machine provides large numbers in ascending order or in descending order and the large numbers are not cyclic in a preset period of time.

In the described embodiment, the pilot optical signal includes a pilot optical signal 1 and a pilot optical signal 2, and before the method, the following is further included:

setting, by the transmitting end, a structure of the logical operation for each user: a first layer, where the pilot optical signal 1 represents a different user and is encrypted by using a static encryption algorithm; and a second layer, where the pilot optical signal 2 is status of a state machine of a unique dynamic encryption algorithm of the user represented by the pilot optical signal 1;

setting, by the receiving end, a structure of a corresponding logical operation: a first layer, where an encrypted signal of the pilot optical signal 1 is decrypted by using the static encryption algorithm, and there is a table that corresponds to decrypted information, so that the user can be found; and a second layer, where ever-changing state machine information of the user is found by using information about the pilot optical signal 2.

In the described embodiment, after the setting, by the transmitting end, a structure of the logical operation for each user, the method further includes:

setting a third layer, where the state machine corresponds to the dynamic encryption algorithm of the user; and correspondingly, after the setting, by the receiving end, a structure of a corresponding logical operation, the method further includes:

setting a third layer, where a scrambling code of a dynamic encryption algorithm sequence of the user at this moment can be found according to transition of a state machine, and ID information of the user is decrypted by using the scrambling code.

In the described embodiment, the adjusting, by the receiving end, status of a state machine of the receiving end to be synchronous with status of the state machine of the transmitting end specifically includes:

allocating, by a system, an exclusive ID, a dynamic encryption algorithm, and a state machine for a user corresponding to the receiving end, and enabling a start bit of a state machine of the system to be the same as that of an end user at a first interconnection moment; and if the end user has lost synchronization with the system, having to re-interconnect, by the end user, with the system, so that the start bit that is of the state machine of the user and stored in the system is the same as that of the state machine of the end user.

In the described embodiment, the method further includes: controlling, by the receiving end if determining that the received original signal is legal, an action of a functional unit connected to the receiving end.

In the described embodiment, before the sending the scrambled signal in the form of a visible light signal, the method further includes: modulating the scrambled signal.

In the described embodiment, after the receiving, by the receiving end, the visible light signal, the method further includes: demodulating the digital signal.

In the described embodiment, frequencies of the original signal, the pilot optical signal, and the pseudocode signal are the same or in an integer multiple relationship, and start and end phases of the original signal, the pilot optical signal, and the pseudocode signal are the same.

Another embodiment of the disclosure provides a handshake synchronization system for a visible light signal, including a transmitting end and a receiving end, where:

a state machine of the transmitting end varies with unit time, and is connected to the receiving end in a preset period of time; and the transmitting end includes: a first pseudocode generator, configured to output a pseudocode signal which varies with unit time; a pilot optical signal generator, configured to output a pilot optical signal; an encoder, configured to perform a logical operation on an original signal and a pilot optical signal separately with a pseudocode signal of the current period of time to obtain an encrypted original signal and an encrypted pilot optical signal, and combine the encrypted original signal and the encrypted pilot optical signal to obtain the scrambled signal; and a sending unit, configured to send the scrambled signal in a blinking form; and a state machine of the receiving end is synchronous with status of the state machine of the transmitting end in the preset period of time; and the receiving end includes: a receiving unit, configured to receive the visible light signal and convert the visible light signal into a digital signal; a decomposing unit, configured to decompose the digital signal to obtain an encrypted original signal and an encrypted pilot optical signal; an inverter, configured to invert the encrypted pilot optical signal; a second pseudocode generator, configured to output a pseudocode signal which varies with unit time; a pseudocode determiner, configured to, after the encrypted pilot optical signal is inverted, compare an inverted encrypted pilot optical signal with a pseudocode signal corresponding to current status; and a decoder, configured to use the pseudocode signal corresponding to the current status to decrypt the encrypted original signal.

In the described embodiment, the receiving end further includes: an original signal determiner, connected to the decoder and the pseudocode determiner, and configured to compare a decrypted original signal with an original signal prestored in the pseudocode determiner and determine legality of a received original signal.

In the described embodiment, the transmitting end further includes: a modulator, connected between the encoder and the sending unit, and configured to modulate the scrambled signal.

In the described embodiment, the receiving end further includes: a demodulator, connected between the receiving unit and the decomposing unit, and configured to demodulate the digital signal.

In the described embodiment, the first pseudocode generator and the second pseudocode generator have same operating status, and a frequency that is the same or in an integer multiple relationship.

Still another embodiment of the disclosure provides a handshake synchronization method based on visible light communication, including:

connecting, by a transmitting end, in which a state machine varies with unit time, to a receive and control system, and adjusting, by the receive and control system, status of a state machine of the receive and control system to be synchronous with status of the state machine of the transmitting end, where the receive and control system includes one or multiple receiving ends;

performing, by the transmitting end, a logical operation on an original signal and a pilot optical signal separately with a pseudocode signal of the current period of time to obtain an encrypted original signal and an encrypted pilot optical signal, combining the encrypted original signal and the encrypted pilot optical signal to obtain the scrambled signal, and sending the scrambled signal in the form of a visible light signal; and receiving, by the receive and control system, the visible light signal, and converting the visible light signal into a digital signal and then performing decomposition to obtain an encrypted original signal and an encrypted pilot optical signal; performing a logical operation on the encrypted pilot optical signal with a prestored pseudocode signal corresponding to a state machine of all users in the current period of time, and identifying a pseudocode signal corresponding to the pilot optical signal in the current status according to relevant peaks; and using the pseudocode signal corresponding to the current status to decrypt the encrypted original signal.

In the described embodiment, the method further includes: comparing, by the receive and control system, a decrypted original signal with a prestored original signal, and determining legality of a received original signal.

In the described embodiment, the method further includes: controlling, by the receive and control system if determining that the received original signal is legal, an action of a functional unit connected to the receive and control system.

In the described embodiment, before the sending the scrambled signal in the form of a visible light signal, the method further includes: modulating the scrambled signal.

In the described embodiment, after the receiving, by the receive and control system, the visible light signal, the method further includes: demodulating the digital signal.

In the described embodiment, frequencies of the original signal, the pilot optical signal, and the pseudocode signal are the same or in an integer multiple relationship, and start and end phases of the original signal, the pilot optical signal, and the pseudocode signal are the same.

Yet another aspect of the disclosure provides a handshake synchronization system based on visible light communication, including a transmitting end and a receive and control system, where the receive and control system includes one or multiple receiving ends; where a state machine of the transmitting end varies with unit time, and is connected to the receive and control system in a preset period of time; and the transmitting end includes: a pseudocode generator, configured to output a pseudocode signal which varies with unit time; a pilot optical signal generator, configured to output a pilot optical signal; an encoder, configured to perform a logical operation on an original signal and a pilot optical signal separately with a pseudocode signal of the current period of time to obtain an encrypted original signal and an encrypted pilot optical signal, and combine the encrypted original signal and the encrypted pilot optical signal to obtain the scrambled signal; and a sending unit, configured to send the scrambled signal in a blinking form; and when the receive and control system is connected to the transmitting end, status of a state machine of the receive and control system is synchronous with status of the state machine of the transmitting end; and each receiving end includes: a receiving unit, configured to receive the scrambled signal; a decomposing unit, configured to decompose the scrambled signal to obtain an encrypted original signal and an encrypted pilot optical signal; a pseudocode determiner, configured to, perform a logical operation on the encrypted pilot optical signal with a prestored pseudocode signal corresponding to a state machine of all users in the current period of time, and determine a pseudocode signal corresponding to the current status according to relevant peaks; and a decoder, configured to use the pseudocode signal corresponding to the current status to decrypt the encrypted original signal.

In the described embodiment, the receiving end further includes: an original signal determiner, connected to the decoder and the pseudocode determiner, and configured to compare a decrypted original signal with an original signal prestored in the pseudocode determiner and determine legality of a received original signal.

In the described embodiment, the transmitting end further includes: a modulator, connected between the encoder and the sending unit, and configured to modulate the scrambled signal.

In the described embodiment, the receiving end further includes: a demodulator, connected between the receiving unit and the decomposing unit, and configured to demodulate the digital signal.

In the described embodiment, the receive and control system further includes a system control platform connected to the receiving end.

Yet still another aspect of the disclosure provides a handshake synchronization restoration method, including:

after a transmitting end in which a state machine varies with unit time is powered on again, transmitting in the form of a visible light signal, to a receive and control system, a status reset signal which varies with unit time, where the receive and control system includes one or multiple receiving ends; and receiving, by the receive and control system, the visible light signal, and when it is determined that the received visible light signal is a status reset signal, adjusting status of a state machine of a receiving end to a state indicated by the status reset signal.

In the described embodiment, before the method, the following is further included: connecting, by the transmitting end, to the receive and control system, and adjusting, by the receive and control system, the status of the state machine of the receiving end to be synchronous with status of the state machine of the transmitting end; performing, by the transmitting end, a logical operation on an original signal and a pilot optical signal separately with a pseudocode signal of the current period of time to obtain an encrypted original signal and an encrypted pilot optical signal, combining the encrypted original signal and the encrypted pilot optical signal to obtain the scrambled signal, and sending the scrambled signal in the form of a visible light signal; receiving, by the receive and control system, the scrambled signal, and decomposing the scrambled code into the encrypted original signal and the encrypted pilot optical signal; performing a logical operation on the encrypted pilot optical signal with a prestored pseudocode signal corresponding to a state machine of all users in the current period of time, and identifying a pseudocode signal corresponding to the pilot optical signal in the current status according to relevant peaks; and using the pseudocode signal corresponding to the current status to decrypt the encrypted original signal.

In the described embodiment, the method further includes: comparing, by the receive and control system, a decrypted original signal with a prestored original signal, and determining legality of a received original signal; and controlling, by the receive and control system if determining that the received original signal is legal, an action of a functional unit connected to the receive and control system.

In the described embodiment, frequencies of the original signal, the pilot optical signal, and the pseudocode signal are the same or in an integer multiple relationship, and start and end phases of the original signal, the pilot optical signal, and the pseudocode signal are the same.

In the described embodiment, before the sending the scrambled signal in the form of a visible light signal, the method further includes: modulating the scrambled signal; and correspondingly, after the receiving, by the receive and control system, the visible light signal, the method further includes: demodulating the digital signal.

Yet still another aspect of the disclosure provides a handshake synchronization restoration system, including a transmitting end and a receive and control system, where the receive and control system includes one or multiple receiving ends; where:

the transmitting end in which a state machine varies with unit time includes: a status reset unit, configured to, after being powered on, transmit, to the receive and control system, a status reset signal which varies with unit time; and a transmitting unit, connected to the status reset unit and configured to transmit the status reset signal in the form of a visible light signal; and each receiving end of the receive and control system includes: a receiving unit, configured to receive the visible light signal; and a status reset determiner, connected to the receiving unit and configured to, when it is determined that the received visible light signal is a status reset signal, output an instruction for adjusting status of a state machine to a state indicated by the status reset signal.

In the described embodiment, the transmitting end further includes: a pseudocode generator, connected to the status reset unit and configured to output a pseudocode signal which varies with unit time; a pilot optical signal generator, configured to output a pilot optical signal; and an encoder, configured to perform a logical operation on an original signal and a pilot optical signal separately with a pseudocode signal of the current period of time to obtain an encrypted original signal and an encrypted pilot optical signal, and combine the encrypted original signal and the encrypted pilot optical signal to obtain the scrambled signal; and the receiving end further includes: a pseudocode determiner, connected to the status reset determiner and configured to perform a logical operation on the encrypted pilot optical signals output by the status reset determiner with a pseudocode signal that is prestored in the system and corresponds to a state machine of all users in the current period of time, and determine a pseudocode signal corresponding to current status of a period of time according to relevant peaks; and a decoder, connected to the status reset determiner and configured to use the pseudocode signal corresponding to the current status to decrypt the encrypted original signal output by the status reset determiner.

In the described embodiment, the receiving end further includes: an original signal determiner, connected to the decoder and the pseudocode determiner, and configured to compare a decrypted original signal with an original signal prestored in the pseudocode determiner and determine legality of a received original signal.

In the described embodiment, the transmitting end further includes: a modulator, connected between the encoder and the sending unit, and configured to modulate the scrambled signal; and correspondingly, the receive and control system further includes: a demodulator, connected between the receiving unit and the decomposing unit, and configured to demodulate the digital signal.

In the described embodiment, the receive and control system includes a system control platform connected to the receiving end.

Compared with the related art, the foregoing technical solutions have the following advantages: A visible light signal transmitted between a transmitting end and a receiving end is not an original signal but is an encrypted scrambled signal, and the scrambled signal varies with unit time. A current period of time is different from a next period of time. Therefore, it is not easy for cracking, thereby improving security of a photonic Internet of Things.

BRIEF DESCRIPTION OF DRAWINGS

To describe the technical solutions in the embodiments of the disclosure more clearly, the following briefly introduces the accompanying drawings required for describing the embodiments.

DESCRIPTION OF EMBODIMENTS

Figure 1:
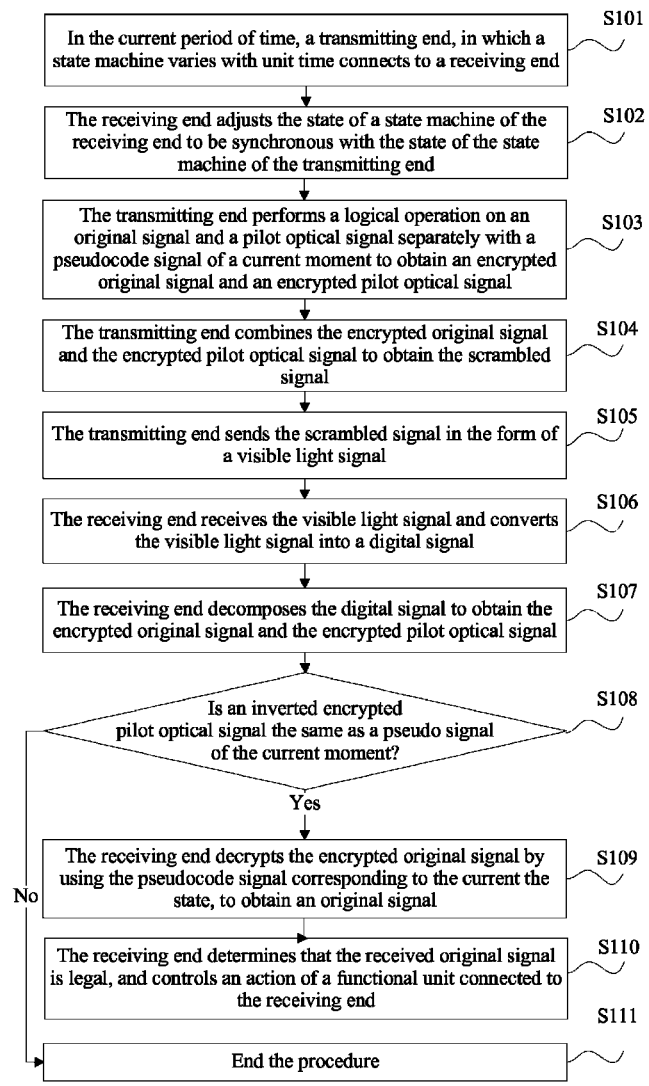
FIG. 1 is a flowchart of a handshake synchronization method for a visible light signal according to Embodiment 1 of the disclosure.

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

The disclosure is characterized in encrypting a strobe signal of visible light in a free spatial environment. An LED strobe signal emitted from a transmitting end, if shot by using a high-speed camera, may be replicated to obtain an optical signal with a same strobe. Because in the related art, information used for decoding by a receiving end is not encrypted or an encrypted pseudocode signal is fixed, a replicated optical signal may be identified by the receiving end and correctly decrypted. Therefore, encryption is useless, leading to a security risk. For this, a dynamic encryption method is proposed, and aims to make a transmitted ID time-varying by means of dynamic encryption. In addition, an ID is valid for one time only. A previous ID is invalid, and a current ID can be correctly identified by the receiving end. A set of comprehensive solutions are proposed, and the solutions are as follows:

1. In the disclosure, pilot optical signals and an original signal are physically connected together, and propagated, consecutively in terms of time, toward free space by using a transmitting end.

2. Information in the disclosure is implemented by controlling blinking of an LED. Light propagation of the LED in free space indicates 1, and LED off indicates 0. An implementation means is to perform a logical operation on the pilot optical signals and the original signal with the scrambled signal, and impose on an LED driver to drive the LED to be on or off.

3. Because an LED of a mobile phone blinks at a relatively low speed, a bit rate of valid information transmitted by strobing is relatively low, lower than 100 bit/s, which is different from existing communications technologies such as wireless communications and optical fiber communications. A rate in a modern traditional communication technology is fast, and a rate in wireless communications and optical fiber communications is over 100 times higher than that of visible light communication by strobing by a mobile phone. Therefore, for example, wireless communications may use a relatively long dynamic encryption sequence on an air interface. The dynamic encryption sequence may be allocated to different users, and all users may share a unified dynamic encryption sequence, such as a 256-bit pseudo random sequence. Because there are only valid information bits of less than 100 bits, it is impossible to use a unified dynamic encryption sequence. If a parity bit is deducted and a light guide channel is deducted, the number of bits that are actually left for a user is relative small. The solutions are as follows:

A: A different dynamic encryption sequence is set for each customer, that is, a sequence for a dynamic encryption algorithm of each customer is different. Otherwise, if a unified dynamic encryption algorithm is used, a problem that the number of bits of valid available information is insufficient exists. Under a limited information bit length, using unified dynamic encryption has a security problem, which is easy to be cracked.

When an end user is connected to a system for the first time, the system allocates the user an exclusive ID, a dynamic encryption algorithm, and a state machine, so that at an interconnection moment for the first time, a start bit of the state machine is the same between the system and the end user. If the end user has lost synchronization with the system, the end user has to re-interconnect with the system, so that the start bit that is of the state machine of the user and stored in the system is the same as that of the state machine of the end user.

B: Pilot optical signal 1 and pilot optical signal 2 are set up, where the pilot optical signal 1 is used to identify a different user, and the pilot optical signal 2 represents a state machine corresponding to the user. A transition state on the state machine corresponds to the dynamic encryption algorithm for the user.

Therefore, the solution is to provide an exclusive dynamic encryption algorithm for each user, and on an air interface, an encryption method for each user is an exclusive there-layer logical structure. A first layer: a pilot optical signal 1 represents a different user in the system, and is encrypted by using a static encryption algorithm; a second layer: a pilot optical signal 2 is status of a state machine of a unique dynamic encryption algorithm of the user represented by the pilot optical signal 1; and a third layer: the state machine corresponds to the dynamic encryption algorithm of the user. At the receiving end, there is a corresponding logical structure: a first layer where a static encryption algorithm decrypts an encrypted signal of the pilot optical signal 1, and there is a table that corresponds to decrypted information, so that the user can be found; and a second layer, where ever-changing state machine information of the user is found by using information about the pilot optical signal 2; and a third layer, where a scrambling code of a dynamic encryption algorithm sequence of the user at this moment can be found according to transition of a state machine, and ID information of the user can be decrypted by using the scrambling code.

C: As described above, because a problem that the number of bits of valid available information is insufficient exists, the user described above may not be in a one-to-one correspondence with an actual end user. Several actual end users may share one user in a dynamic encryption system, that is, share one dynamic encryption algorithm.

D: Likewise, because bits of valid available information are insufficient, after a period of time, there is a dynamic encryption algorithm circulated back to an initial state. Because of different encryption algorithms of different users, and bits of information are quite limited, once an encryption algorithm is circulated back, for example, a pseudo random sequence formed by a 32-bit trigger is back to an initial state, a decryption disorder is caused, resulting in, for example, incorrect identification of an ID, for example, an ID is identified as another ID, and a correct ID cannot be unidentified. As a result, an entire encryption system crashes. Therefore, a difference from an existing encryption technology lies in that an exclusive state machine is set, where the state machine is large numbers in ascending order or in descending order. It is ensured that the large numbers are not circulated back in ascending order or in descending order in scores of years, thereby ensuring orderly transition, in the system, of many dynamic encryption algorithms in limited information bits. The receiving end makes a determination on the large numbers. For example, in ascending order, if a received state machine status number is smaller than a previous number, a rule of no cycling for ascending order in the system is violated. Therefore, it can be determined that the signal is a replicated illegal signal. Conversely, if a state machine status number received by the receiving end is larger than a number previously received by the receiving end, it is passed, and the system proceeds with a next step.

E: As described above, because a dynamic encryption mechanism of each user is different, interconnection and synchronization, of a state machine of each user, with the system are very important. To ensure orderly working of dynamic encryption systems of an entire system, an exclusive handshake synchronization mechanism is set up. When an end user is connected to a system for the first time, the system allocates the user an exclusive ID, a dynamic encryption algorithm, and a state machine, so that at an interconnection moment for the first time, a start bit of the state machine is the same between the system and the end user. If the end user has lost synchronization with the system, the end user has to re-interconnect with the system, so that the start bit that is of the state machine of the user and stored in the system is the same as that of the state machine of the end user.

In summary, the disclosure provides a method in which a transmitting end encrypts an original signal, and a receiving end decrypts an encrypted signal to restore the original signal in a photonic Internet of Things. In this method, a pseudocode signal used by the transmitting end and the receiving end keeps changing with time. By using the synchronization method described in the disclosure, the receiving end can identify a pseudocode signal used for encryption, and a pseudocode signal used for decryption can keep highly consistent with a pseudocode signal of the transmitting end, so that correct decryption can be performed. Because the pseudocode signal used by the transmitting end and the receiving end keeps changing with time, in a same time, the receiving end can identify whether a visible light signal transmitted by the transmitting end is a legal signal. Because only an encrypted signal of the current period of time is valid, and an encrypted signal of a previous period of time is invalid, a strobe optical signal replicated by shooting by using a high-speed camera, when attempting to perform access in other time, is identified as an illegal signal, and a device at a controlled end cannot be controlled any more, thereby improving security of a system in a photonic Internet of Things.

The disclosure further provides a restoration method after synchronization is lost. In a case, for example, when a transmitting end encounters power outage and then is powered on again, status of the transmitting end is that synchronization information is lost, and is restored to an initial state. However, status of a receiving end at this moment may not be an initial state. In this case, the transmitting end and the transmitting end cannot keep synchronous, that is, a pseudocode sequence used by the transmitting end for encryption is inconsistent with a pseudocode sequence used by the receiving end for decryption. Therefore, a visible light signal transmitted by the transmitting end cannot be correctly decrypted at the receiving end. After the transmitting end encounters power outage and is then powered on again, a status reset signal which varies with unit time is first sent to the receiving end, and the receiving end adjusts status of a state machine of the receiving end according to the status reset signal, so that status synchronization with the transmitting end is restored, avoiding a case in which the transmitting end is asynchronous with the receiving end after encountering power outage and being powered on again. In addition, because the status reset signal varies with unit time, a status reset signal shot in the current period of time is not applicable to a next period of time, thereby improving security.

Embodiment 1

Referring to FIG. 1, FIG. 1 is a flowchart of a handshake synchronization method for a visible light signal according to Embodiment 1 of the disclosure. The method includes:

S101: In the current period of time, a transmitting end in which a state machine varies with unit time connects to a receiving end.

S102: The receiving end adjusts status of a state machine of the receiving end to be synchronous with status of the state machine of the transmitting end.

A handshake between a transmitting end and a receiving end is implemented by performing S101 and S102.

S103: The transmitting end performs a logical operation on an original signal and a pilot optical signal separately with a pseudocode signal of the current period of time to obtain an encrypted original signal and an encrypted pilot optical signal.

Frequencies of the original signal, the pilot optical signal, and the pseudocode signal are the same or in an integer multiple relationship, and start and end phases of the original signal, the pilot optical signal, and the pseudocode signal are the same.

The original signal is a digital sequence signal, and also called baseband data. A pilot optical signal of a period of time is generated by a pilot optical signal generator, and is a group of all-"1" binary digits before being scrambled.

For example, in a T1 time, it is assumed that a baseband signal of a transmitting end 1 is 00000000000000000000000000000001101111111111111111 1111111111111111, totaling 64 bits, where the first 32 bits are an original signal of the transmitting end 1, that is, 00000000000000000000000000000110; and the last 32 bits are an all-1 pilot optical signal. In a T1 unit time, status of a pseudocode generator is a state 1, and is assumed to be 11101001110100111010001001001101; then, the logical operation thereof, that is, an exclusive OR process, is shown in Table 1.

TABLE 1

| Logical operation process of an original signal of a transmitting end 1 in a T1 unit time | | | | | | | | | | | | | | | | | |
|---|---|---|---|---|---|---|---|---|---|---|---|---|---|---|---|---|---|
| Original signal | 0 | 0 | 0 | 0 | 0 | 0 | 0 | 0 | 0 | 0 | 0 | 0 | 0 | 0 | 0 | 0 |
| Pseudocode signal | 1 | 1 | 1 | 0 | 1 | 0 | 0 | 1 | 1 | 1 | 0 | 1 | 0 | 0 | 1 | 1 | 1 |
| Output signal | 1 | 1 | 1 | 0 | 1 | 0 | 0 | 1 | 1 | 1 | 0 | 1 | 0 | 0 | 1 | 1 | 1 |
| Original signal | | 0 | 0 | 0 | 0 | 0 | 0 | 0 | 0 | 0 | 0 | 0 | 0 | 1 | 1 | 0 |
| Pseudocode signal | | 0 | 1 | 0 | 0 | 0 | 1 | 0 | 0 | 1 | 0 | 0 | 1 | 1 | 0 | 1 |
| Output signal | | 0 | 1 | 0 | 0 | 0 | 1 | 0 | 0 | 1 | 0 | 0 | 1 | 0 | 1 | 1 |

It may be learned from Table 1 that a convoluted output signal, that is, the encrypted original guide signal is 11101001110100111010001001001011.

The logical operation on the pilot optical signal with the pseudocode signal, which is an exclusive OR process shown in Table 2.

TABLE 2

| Logical operation process of a pilot optical signal of a transmitting end 1 in a T1 unit time | | | | | | | | | | | | | | | | | |
|---|---|---|---|---|---|---|---|---|---|---|---|---|---|---|---|---|---|
| Pilot optical signal | 1 | 1 | 1 | 1 | 1 | 1 | 1 | 1 | 1 | 1 | 1 | 1 | 1 | 1 | 1 | 1 | 1 |

TABLE 2-continued

Logical operation process of a pilot optical signal of a transmitting end 1 in a T1 unit time

| Pseudocode signal | 1 | 1 | 1 | 0 | 1 | 0 | 0 | 1 | 1 | 1 | 0 | 1 | 0 | 0 | 1 | 1 | 1 |
|---|---|---|---|---|---|---|---|---|---|---|---|---|---|---|---|---|---|
| Output signal | 0 | 0 | 0 | 1 | 0 | 1 | 1 | 0 | 0 | 0 | 1 | 0 | 1 | 1 | 0 | 0 | 0 |
| Pilot optical signal | 1 | 1 | 1 | 1 | 1 | 1 | 1 | 1 | 1 | 1 | 1 | 1 | 1 | 1 | 1 | | |
| Pseudocode signal | 0 | 1 | 0 | 0 | 0 | 1 | 0 | 0 | 1 | 0 | 0 | 1 | 1 | 0 | 1 | | |
| Output signal | 1 | 0 | 1 | 1 | 1 | 0 | 1 | 1 | 0 | 1 | 1 | 0 | 0 | 1 | 0 | | |

It may be learned from Table 2 that an output signal after the logical operation, that is, the encrypted pilot optical signal is 00010110001011000101110110110010.

S104: The transmitting end combines the encrypted original signal and the encrypted pilot optical signal to obtain the scrambled signal.

For example, the encrypted original signal 11101001110100111010001001001011 and the encrypted pilot optical signal 00010110001011000101110110110010 are combined to obtain the scrambled signal 1110100111010011101000100100101100010110001011000101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination. Other examples are not described herein one by one.

S105: The transmitting end sends the scrambled signal in the form of a visible light signal.

It is assumed that X(t) represents a baseband data signal in a photon transmitter, PW represents a pilot optical signal of the photon transmitter, and PN(t) represents a pseudocode sequence signal; then, the output signal Y(t) may be represented by the following expression: $Y(t)=X(t)*PN(t)+PW*PN(t)$.

If a signal transmitted at this moment is shot for duplication by a high-speed camera, the replicated signal is also 1110100111010011101000100100101100010110001011000101110110110010.

S106: The receiving end receives the visible light signal and converts the visible light signal into a digital signal.

Specifically, the receiving end converts an optical signal into a current signal, converts the current signal into a voltage signal, and outputs the voltage signal as a digital signal.

S107: The receiving end decomposes the digital signal to obtain the encrypted original signal and the encrypted pilot optical signal.

S108: After inverting the encrypted pilot optical signal, the receiving end compares the encrypted pilot optical signal with a pseudocode signal corresponding to current status; if the inverted encrypted pilot optical signal is the same as the pseudocode signal corresponding to the current status, perform S109; otherwise, perform S111.

The received encrypted pilot optical signal is 00010110001011000101110110110010, and after being inverted, is 11101001110100111010001001001101. The pseudocode signal, corresponding to the current status, of the receiving end is the same as the pseudocode signal, corresponding to the current period of time, of the transmitting end. Therefore, if the pseudocode signal of the current status of the receiving end is also 11101001110100111010001001001101, it is determined that the received visible light signal is a legal signal.

S109: The receiving end decrypts the encrypted original signal by using the pseudocode signal corresponding to the current status, to obtain an original signal.

For example, the logical operation is performed on the pseudocode signal 11101001110100111010001001001101 with the encrypted original signal 11101001110100111010001001001011 to obtain a decrypted original signal, that is, 00000000000000000000000000000110.

It is assumed that when a T2 period of time arrives, the original signal and the pilot optical signal of the transmitting end 1 remain unchanged and are still 0000000000000000000000000000000011011111111111111111111111111111. However, at this moment, the status of the pseudocode generator of the transmitting end changes, that is, changes to a state 2. It is assumed that a pseudocode sequence corresponding to the state 2 is 10101101010100101011001101011010; then, the transmitting end performs the logical operation, which is an exclusive OR process shown in Table 3.

TABLE 3

Logical operation process of an original signal of a transmitting end 1 in a T2 unit time

| Original signal | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| Pseudocode signal | 1 | 0 | 1 | 0 | 1 | 1 | 0 | 1 | 0 | 1 | 0 | 1 | 0 | 0 | 1 | 0 |
| Output signal | 1 | 0 | 1 | 0 | 1 | 1 | 0 | 1 | 0 | 1 | 0 | 1 | 0 | 0 | 1 | 0 |

TABLE 3-continued

Logical operation process of an original signal of a transmitting end 1 in a T2 unit time

| Original signal | 0 | 0 | 0 | 0 | 0 | 0 | 0 | 0 | 0 | 0 | 0 | 0 | 1 | 1 | 0 |
|---|---|---|---|---|---|---|---|---|---|---|---|---|---|---|---|
| Pseudocode signal | 0 | 1 | 1 | 0 | 0 | 1 | 1 | 0 | 1 | 0 | 1 | 1 | 0 | 1 | 0 |
| Output signal | 0 | 1 | 1 | 0 | 0 | 1 | 1 | 0 | 1 | 0 | 1 | 1 | 1 | 0 | 0 |

It may be learned from Table 3 that an output signal after the logical operation, that is, the encrypted original signal, is 10101101010010101100110101100.

The logical operation on the pilot optical signal with the pseudocode signal, which is an exclusive OR process shown in Table 4.

TABLE 4

Logical operation process of a pilot optical signal of a transmitting end 1 in a T2 unit time

| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|
| Pseudocode signal | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 0 | 1 | 0 |
| Output signal | 0 | 1 | 0 | 1 | 0 | 0 | 1 | 0 | 1 | 0 | 1 | 0 | 1 | 1 | 0 | 1 | 0 | 1 | 0 | 0 | 1 | 1 | 0 | 0 | 1 | 0 | 1 | 0 | 0 | 1 | 0 | 1 |

It may be learned from Table 4 that an output signal after the logical operation, that is, the encrypted pilot optical signal is 01010010101011010100110010100101.

From Table 3 and Table 4, it may be obtained that the pseudocode signal transmitted by the transmitting end in the T2 unit time is 10101101010100101011001101011100010100101010110101001100101000101.

In the T2 period of time, if a signal replicated in the T1 period of time, that is, 11101001110100111010001001001011000101100010110001011000101100010101110110110010, is used by the receiving end for identification in the T2 period of time, an encrypted pilot signal is 000101100010110001011101101110110010, and an inverting operation is performed on the encrypted pilot signal to obtain a signal: 111010011101001110100010010011101. However, in the T2 period of time, a pseudocode sequence generated by the pseudocode generator of the receiving end has already changed in the same way as the transmitting end, that is, the pseudocode signal of the current status of the receiving end is 10101101010010101100110101011010. The two signals are different, and it is determined that the replicated signal is an illegal signal. Therefore, information replicated in a process of optical signal transmission cannot be identified by the receiving end in a next period of time, and becomes expired information, thereby improving security of a photonic Internet of Things.

Hereto, a handshake synchronization process during signal transmission between the receiving end and the transmitting end is completed. In a specific implementation process, after S109, the following steps are further included:

S110: The receiving end determines that the received original signal is legal, and controls an action of a functional unit connected to the receiving end, for example, controls to unlock a door lock or controls an electrical appliance to enter a working state.

S111: End the procedure.

In Embodiment 1, for the step in which the transmitting end performs a logical operation on the original signal and the pilot optical signal separately with the pseudocode signal of the current period of time, the exclusive OR operation is used as an example for description. In a specific implementation process, another logical operation, for example, a logical AND operation may further be included, which is not described herein again.

Embodiment 2

Figure 2:
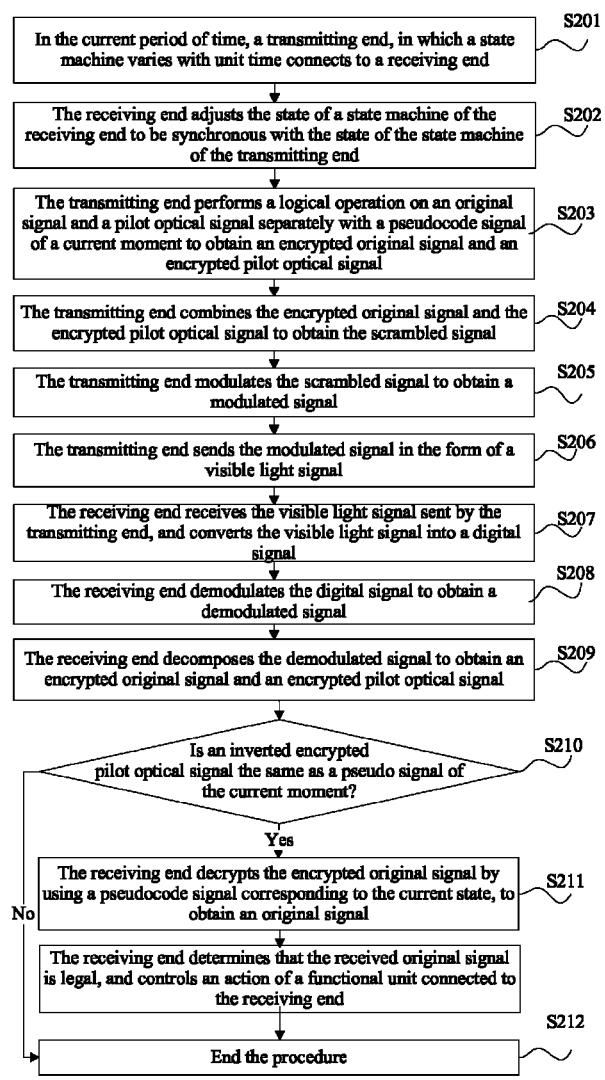
FIG. 2 is a flowchart of a handshake synchronization method for a visible light signal according to Embodiment 2 of the disclosure.

Referring to FIG. 2, FIG. 2 is a flowchart of a handshake synchronization method for a visible light signal according to Embodiment 2 of the disclosure. The method includes:

S201: In the current period of time, a transmitting end in which a state machine varies with unit time connects to a receiving end, and sends status of the state machine of the transmitting end in the current period of time to the receiving end.

S202: The receiving end enables status of a state machine of the receiving end to be synchronous with the status of the state machine of the transmitting end.

A handshake between a transmitting end and a receiving end is implemented by using S201 and S202.

S203: The transmitting end performs a logical operation on an original signal and a pilot optical signal separately with a pseudocode signal of the current period of time to obtain an encrypted original signal and an encrypted pilot optical signal.

The pseudocode signal varies with the unit time. The pseudocode signal of the current period of time is discarded in a next period of time, and a new pseudocode signal is used. Frequencies of the original signal, the pilot optical signal, and the pseudocode signal are the same or in an integer multiple relationship, and start and end phases of the original signal, the pilot optical signal, and the pseudocode signal are the same.

S204: The transmitting end combines the encrypted original signal and the encrypted pilot optical signal to obtain the scrambled signal.

For example, an encrypted original signal 11101001110100111010001001001011 and an encrypted pilot optical signal 000101100010110001011101101110110010 are combined to obtain the scrambled signal 11101001110100111010001001001011000101100010110001011000101011011010110010.

S205: The transmitting end modulates the scrambled signal to obtain a modulated signal. S206: The transmitting end sends the modulated signal in the form of a visible light signal. For example, the transmitting end sends the modulated signal in a blinking form by using an LED lamp.

S207: The receiving end receives the visible light signal sent by the transmitting end, and converts the visible light signal into a digital signal.

S208: The receiving end demodulates the digital signal to obtain a demodulated signal.

S209: The receiving end decomposes the demodulated signal to obtain an encrypted original signal and an encrypted pilot optical signal.

S210: After inverting the encrypted pilot optical signal, the receiving end compares the encrypted pilot optical signal with a pseudocode signal corresponding to current status; if the inverted encrypted pilot optical signal is the same as the pseudocode signal corresponding to the current status, perform S211; otherwise, perform S213.

For example, status of a register 1 of the receiving end in a T1 period of time is a state 1, that is, the pseudocode signal is 11101001110100111010001001001101. In this case, the encrypted pilot optical signal is 00010110001011000101110110110010, and the logical operation is performed on the encrypted pilot optical signal with the random code. By means of relevant peak recognition, a 32-bit all-"1" sequence may be obtained, which indicates that the pseudocode signal is a pseudocode signal used for encryption. The logical operation on the encrypted pilot optical signal with the pseudocode signal, which is an exclusive OR process shown in Table 5.

TABLE 5

Logical operation process of an encrypted pilot optical signal of a receiving end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Encrypted pilot optical signal | 0 | 0 | 0 | 1 | 0 | 1 | 1 | 0 | 0 | 0 | 1 | 0 | 1 | 1 | 0 | 0 | 0 | 1 | 0 | 1 | 1 | 1 | 0 | 1 | 1 | 0 | 1 | 1 | 0 | 0 | 1 | 0 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

S211: The receiving end decrypts the encrypted original signal by using the pseudocode signal corresponding to the current status, to obtain an original signal.

For example, the logical operation is performed on the encrypted original signal 11101001110100111010001001001011 with the pseudocode signal 11101001110100111010001001001101, which is an exclusive OR process shown in Table 6.

It may be learned from Table 6 that the decrypted original signal is 00000000000000000000000000000110.

Hereto, a handshake synchronization process during signal transmission between the receiving end and the transmitting end is completed. In a specific implementation process, after S211, the following steps are further included:

S212: The receiving end determines that the received original signal is legal, and controls an action of a functional unit connected to the receiving end, for example, controls to unlock a door lock or controls an electrical appliance to enter a working state.

S213: End the procedure.

In the foregoing synchronization method, even if a visible light signal transmitted by a transmitting end is shot by a high-speed camera and then replicated, a replicated signal cannot be synchronous with a status change of a receiving end. Therefore, in a different time, even if the replicated signal is used to attempt to identify the receiving end, it can be determined that the replicated signal is an illegal signal, so that security of a photonic Internet of Things can be improved.

The foregoing describes the method embodiments of the disclosure. The following describes in detail exemplary embodiments of a hardware system for running the foregoing method embodiments.

Embodiment 3

Figure 3:
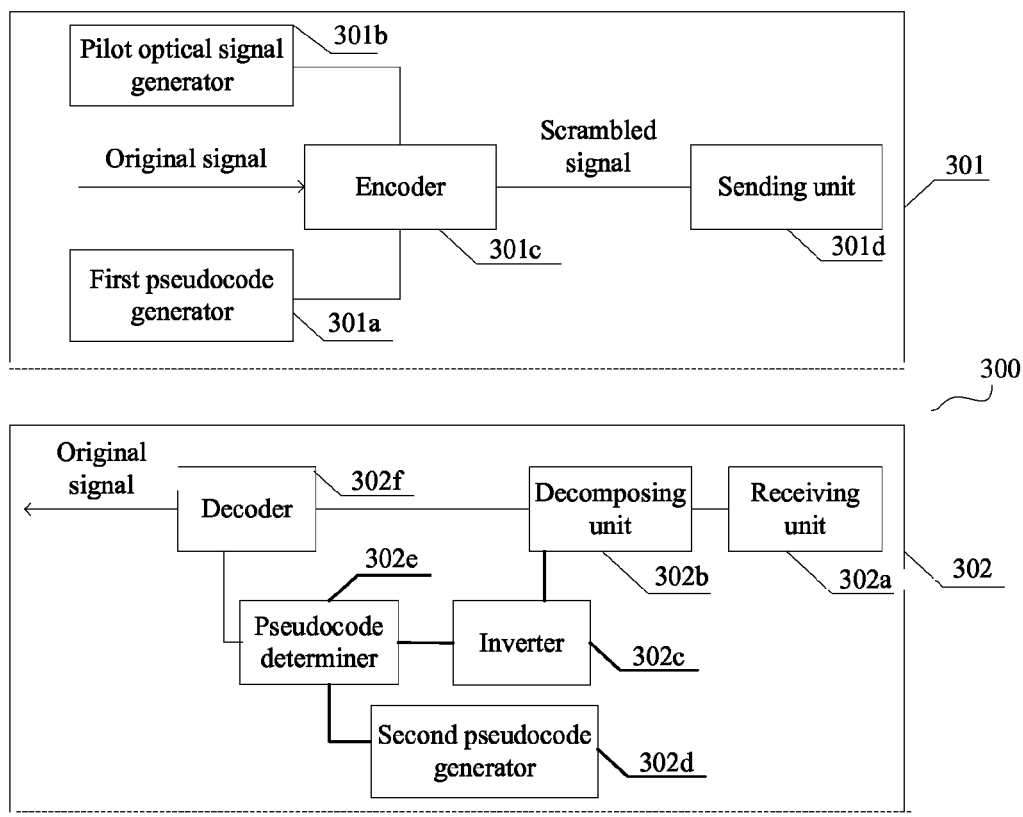
FIG. 3 is a schematic structural diagram of a handshake synchronization system for a visible light signal according to Embodiment 3 of the disclosure.

Referring to FIG. 3, FIG. 3 is a schematic structural diagram of a handshake synchronization system for a visible light signal according to Embodiment 3 of the disclosure. The system 300 includes a transmitting end 301 and a receiving end 302.

A state machine of the transmitting end 301 varies with unit time, connects to the receiving end 302 in a period of time, and sends status of the state machine of the transmitting end in the current period of time to the transmitting end 302. The transmitting end 301 includes a pseudocode generator 301a, a pilot optical signal generator 301b, an encoder 301c, and a light emitting unit 301d.

TABLE 6

Logical operation process of an encrypted pilot optical signal of a receiving end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Encrypted original signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 0 | 1 | 1 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |

The first pseudocode generator 301a is configured to generate and output a pseudocode signal which varies with unit time. Working status of the pseudocode generator 301a varies with the unit time, and the output pseudocode signal also varies with the unit time. For example, in a T1 unit time, the status of the pseudocode generator 301a is a state 1, and the output pseudocode signal is 11101001110100111010001001001101; and in a T2 period of time, the status of the pseudocode generator 301a is a state 2, and the output pseudocode signal is 10101101010100101011001101011010.

The pilot optical signal generator 301b is configured to output a pilot optical signal. A frequency of the pilot optical signal generator 301b and a working frequency of the pseudocode generator are the same or in an integer multiple relationship.

The encoder 301c connected to the pilot optical signal generator 301b and the pseudocode generator 301a is configured to perform a logical operation on an original signal and an optical signal, which is output by the pilot optical signal generator 301b, separately with a pseudocode signal output by the pseudocode generator 301a in the current period of time to obtain an encrypted original signal and an encrypted pilot optical signal. The encrypted original signal and the encrypted pilot optical signal are combined to obtain the scrambled signal. For example, an encrypted original signal 11101001110100111010001001001011 and an encrypted pilot optical signal 00010110001011000101110110110010 are combined to obtain the scrambled signal 1110100111010011101000100100101100010110001011000101100 0101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination.

The light emitting unit 301d connected to the encoder 301c is configured to send, in the form of a visible light signal, the scrambled signal output by the encoder 301c. The sending unit 301c may be a light emitting diode, and may also be another component that has a light emitting function.

The transmitting end 301 may be a dedicated photon client, a mobile phone, or a handheld electronic device that has a function of transmitting a visible light signal.

A state machine of the receiving end 302 is synchronous with status of the state machine of the transmitting end, including: a receiving unit 302a, a decomposing unit 302b, an inverter 302c, a second pseudocode generator 302d, a pseudocode determiner 302e, and a decoder 302f.

The receiving unit 302a receives the visible light signal transmitted by the transmitting end 301a, and converts the visible light signal into a digital signal.

The decomposing unit 302b connected to the receiving unit 302a is configured to decompose the digital signal obtained by conversion by the receiving unit 302a to obtain an encrypted original signal and an encrypted pilot optical signal.

The inverter 302c connected to the decomposing unit 302b is configured to invert the encrypted pilot optical signal output by the decomposing unit 302b.

The pseudocode determiner 302e connected to the inverter 302c and the second pseudocode generator 302d is configured to compare an inverted encrypted pilot optical signal output by the inverter 302c with a pseudocode signal that corresponds to current status and is output by the second pseudocode generator 302d. If the same, it is determined that the scrambled signal is valid. In this embodiment, because the pilot optical signal is an all-"1" digital sequence, the inverted encrypted pilot optical signal is the same as the pseudocode signal of the transmitting end. However, the second pseudocode generator 302d and the first pseudocode generator 301a have same operating status, and a working frequency that is the same or in an integer multiple relationship. If the scrambled signal received by the receiving end is legal, in a same period of time, pseudocode signals output by the second pseudocode generator 302d and the first pseudocode generator 301a are the same, that is, the inverted encrypted pilot optical signal is the same as the pseudocode signal that corresponds to the current status and is output by the second pseudocode generator 302d.

The decoder 302f connected to the decomposing unit 302b and the pseudocode determiner 302e is configured to use the pseudocode signal corresponding to the current status to decrypt the encrypted original signal when the pseudocode determiner 302e determines that the received pseudocode signal is valid.

Embodiment 4

Figure 4:
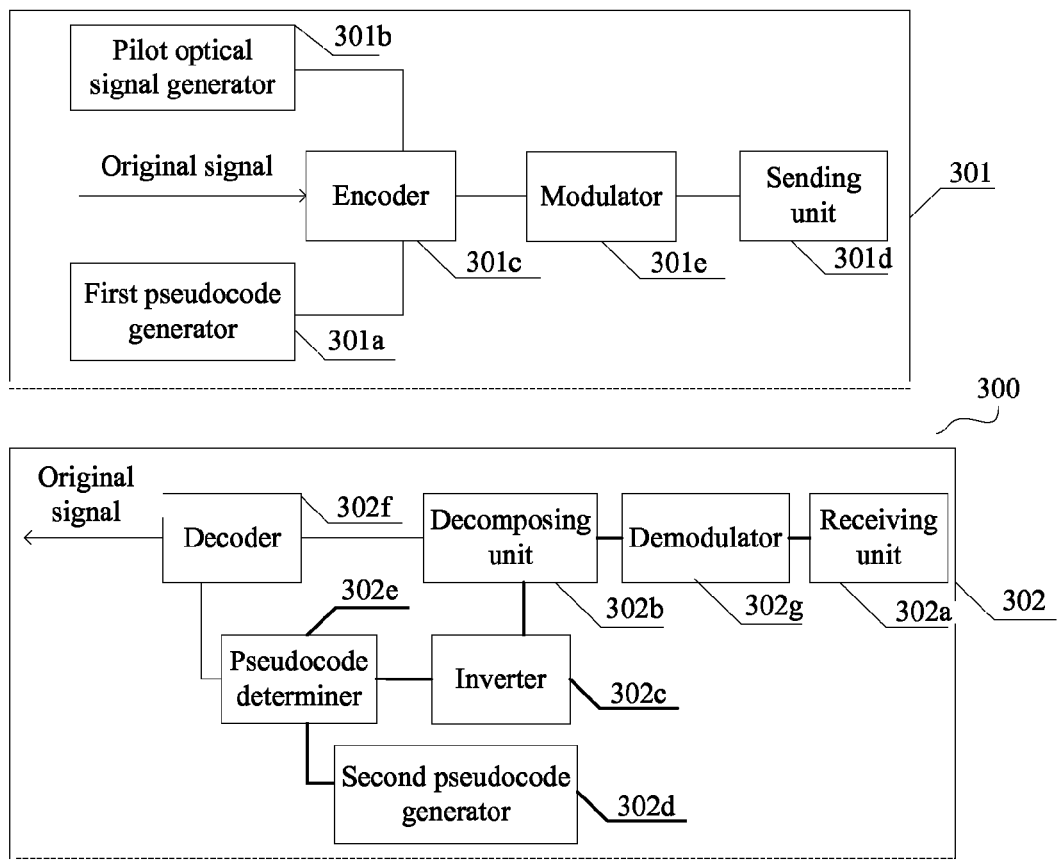
FIG. 4 is a schematic structural diagram of a handshake synchronization system for a visible light signal according to Embodiment 4 of the disclosure.

Referring to FIG. 4, FIG. 4 is a schematic structural diagram of a handshake synchronization system for a visible light signal according to Embodiment 4 of the disclosure. Compared with Embodiment 3, the transmitting end 301 in this embodiment further includes:

a modulator 301e, connected between the encoder 301c and the sending unit 301d, and configured to modulate the scrambled signal.

Correspondingly, the receiving end 302 further includes:

a demodulator 302g, connected between the receiving unit 302a and the decomposing unit 302b, and configured to demodulate the digital signal output by the receiving unit 302a.

In a specific implementation process, the synchronization system 300 may further include a functional unit connected to the receiving unit 302a, for example, an electric lock.

The method and system in the embodiments of the disclosure may be implemented between a transmitting end and a receiving end, and may also be implemented between a transmitting end and a receive and control system. Embodiments thereof are introduced in the following.

Embodiment 5

Figure 5:
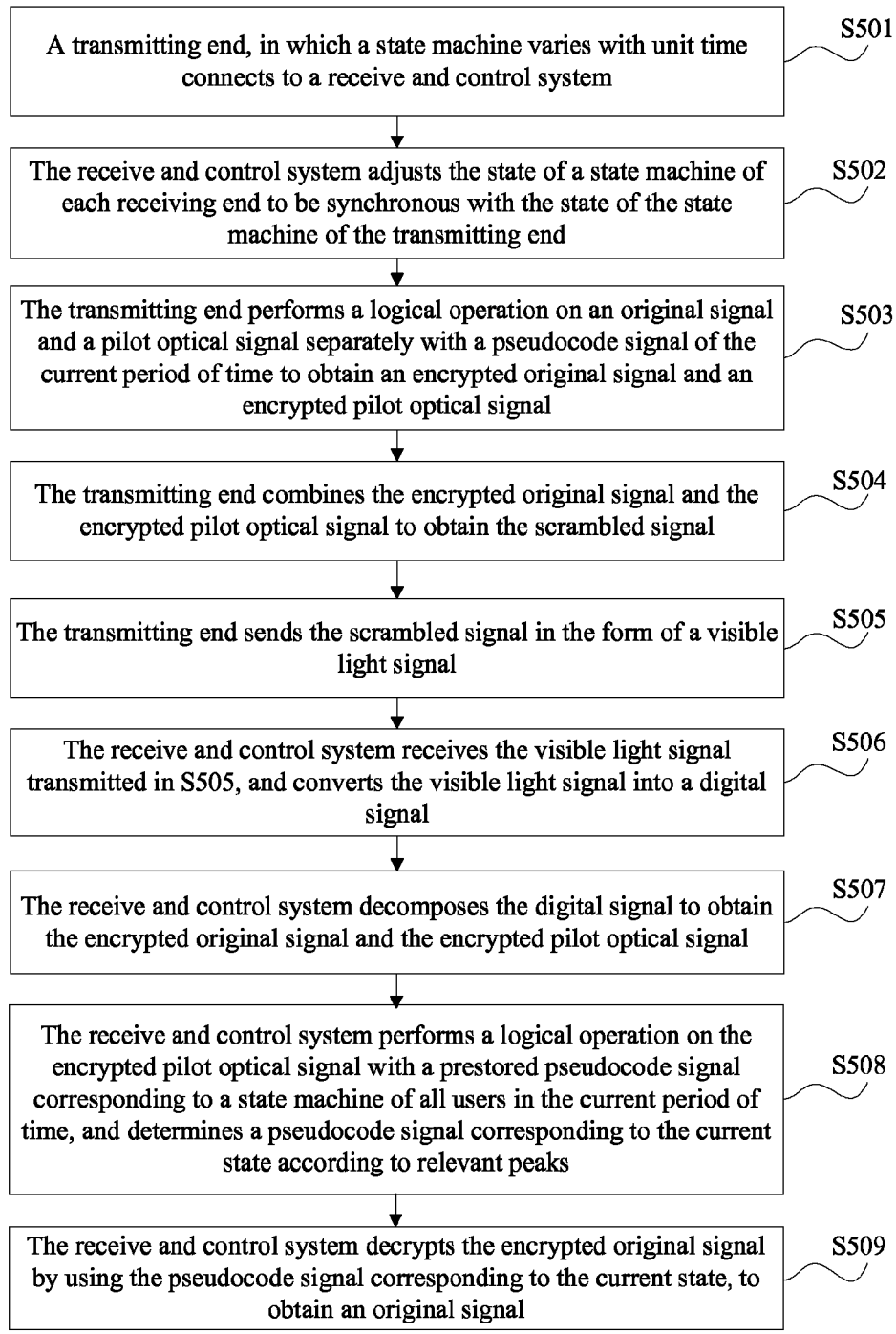
FIG. 5 is a flowchart of a handshake synchronization method for a visible light signal according to Embodiment 5 of the disclosure.

Referring to FIG. 5, FIG. 5 is a flowchart of a handshake synchronization method for a visible light signal according to Embodiment 5 of the disclosure. The method includes:

S501: A transmitting end in which a state machine varies with unit time connects to a receive and control system. By performing this step, the transmitting end and the receive and control system implements a handshake.

The receive and control system may include a system control platform, and each receiving end connected to the system control platform.

Specifically, the state machine of the transmitting end keeps changing with the unit time. When in a certain period of time, the state machine of the transmitting end is exactly in an $N^{th}$ state (N is a positive integer). The transmitting end is connected to the system control platform.

S502: The receive and control system adjusts status of a state machine of each receiving end to be synchronous with status of the state machine of the transmitting end.

Specifically, the system control platform adjusts status of a state machine of the system control platform and the status of the state machine of each receiving end to be synchronous with the status of the state machine of the transmitting end, for example, to be in the $N^{th}$ state.

S503: The transmitting end performs a logical operation on an original signal and a pilot optical signal separately with a pseudocode signal of the current period of time to obtain an encrypted original signal and an encrypted pilot optical signal.

Frequencies of the original signal, the pilot optical signal, and the pseudocode signal are the same or in an integer multiple relationship, and start and end phases of the original signal, the pilot optical signal, and the pseudocode signal are the same.

The original signal is a digital sequence signal, also called baseband data, and may include an ID number. The ID number herein refers to a unique identification code of each transmitting end, and may be binary digits of 8 bits, 16 bits, 24 bits, 32 bits, or the like. If a photonic Internet of Things has M transmitting ends, a baseband signal of each transmitting end is an ID number of the transmitting end. In addition, status of a pseudocode generator of each transmitting end is determined according to both a current time and an ID. If the pseudocode generator also has N states, and each state corresponds to one unique pseudocode signal, in a T1 period of time, a photon transmitter 1 corresponds to a state 1, a photon transmitter 2 corresponds to a state 2, . . . , a photon transmitter M corresponds to a state N; however, in a T2 period of time, the photon transmitter 1 corresponds to the state 2, the photon transmitter 2 corresponds to the state 2, . . . , the photon transmitter M corresponds to the state 1; and so on. In this way, it may be ensured that in a same period of time, a pseudocode signal generated by each transmitting end is different. For a same transmitting end, pseudocode signals generated in different period of times are also different. The pilot optical signal is generated by a pilot optical signal generator and is a group of all-"1" binary digits of 8 bits, 16 bits, 24 bits, 32 bits, or the like.

For example, in a T1 time, it is assumed that a baseband signal of a transmitting end 1 is 0000000000000000000000000000000011011111111111111111 1111111111111111, totaling 64 bits, where the first 32 bits are an ID number of the transmitting end 1, that is, 00000000000000000000000000000110; and the last 32 bits are an all-1 pilot optical signal. In a T1 unit time, status of a pseudocode generator is a state 1, and is assumed to be 11101001110100111010001001001101; then, the logical operation thereof, that is, an exclusive OR process, is shown in Table 7.

TABLE 7

Logical operation process of an original signal of a transmitting end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Original signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 0 | 1 | 1 |

TABLE 8

Logical operation process of a pilot optical signal of a transmitting end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 0 | 0 | 0 | 1 | 0 | 1 | 1 | 0 | 0 | 0 | 1 | 0 | 1 | 1 | 0 | 0 | 0 | 1 | 0 | 1 | 1 | 1 | 0 | 1 | 1 | 0 | 1 | 1 | 0 | 0 | 1 | 0 |

It may be learned from Table 7 that a convoluted output signal, that is, the encrypted original guide signal is 11101001110100111010001001001011.

The logical operation on the pilot optical signal with the pseudocode signal, which is an exclusive OR process shown in Table 8.

It may be learned from Table 8 that an output signal after the logical operation, that is, the encrypted pilot optical signal is 00010110001011000101110110110010.

S504: The transmitting end combines the encrypted original signal and the encrypted pilot optical signal to obtain the scrambled signal.

For example, an encrypted original signal 11101001110100111010001001001011 and an encrypted pilot optical signal 00010110001011000101110110110010 are combined to obtain the scrambled signal 1110100111010011101000100100101100010110001011000101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination. Other examples are not described herein one by one.

S505: The transmitting end sends the scrambled signal in the form of a visible light signal.

It is assumed that ID represents an ID signal of the transmitting end, PW represents a pilot optical signal of the transmitting end, and PN represents a pseudocode signal; then, the output scrambled signal S may be represented by S=ID*PN+ PW*PN. If a signal transmitted at this moment by the transmitting end is shot for duplication by a high-speed camera, a replicated signal is also 1110100111010011101000100100101100010110001011000101110110110010.

S506: The receive and control system receives the visible light signal transmitted in S505, and converts the visible light signal into a digital signal.

Specifically, a receiving end in the receive and control system receives the visible light signal transmitted by the transmitting end, converts an optical signal into a current signal, converts the current signal into a voltage signal, and outputs the voltage signal as a digital signal.

S507: The receive and control system decomposes the digital signal to obtain the encrypted original signal and the encrypted pilot optical signal.

S508: The receive and control system performs a logical operation on the encrypted pilot optical signal with a prestored pseudocode signal corresponding to a state machine of all users in the current period of time, and determines a pseudocode signal corresponding to current status according to relevant peaks.

S508 may be implemented by a receiving end that receives the visible light signal, and may also be implemented by the system control platform.

For example, the receiving ends of the receive and control system, like the transmitting end, also have a same state machine and status of the state machine also keeps changing with time. A difference lies in that: each transmitting end in a period of time corresponds only to one state, which changes to another state after this period of time elapses, that is, only one group of pseudocode signals is generated, and this pseudocode varies with time. However, at the receiving end, M transmitting ends exist, that is, M users exist. A receiving and control end has N states, that is, has N groups of pseudocode signals, and each group of pseudocode signals is different. The N pseudocodes are stored in N registers, and each register corresponds to a unique transmitting end, that is, each register stores an ID of a fixed transmitting end and a pseudocode signal that varies with time, for example, a register 1 always stores an ID of a transmitting end 1, and a register 2 always stores an ID of a transmitting end 2. A pseudocode signal stored by each register corresponds to a pseudocode signal in the transmitting end one by one and is determined by time and keeps changing with time. For example, in the T1 period of time, the register 1 corresponds to the state 1, the register 2 corresponds to the state 2, . . . , a register N corresponds to a state N; however, in the T2 period of time, the register 1 corresponds to the state 2, the register 2 corresponds to the state 2, . . . , the register N corresponds to the state 1; and so on.

The relevant peaks refer to peak values of a group of digital sequences obtained after the logical operation is performed on the encrypted pilot optical signal with the pseudocode signal. For example, the encrypted pilot optical signal is a result of an exclusive OR operation of an all-"1" digital sequence with the pseudocode signal. If the encrypted pilot optical signal and a prestored pseudocode signal corresponding to a state machine of all users in the current period of time are traversed for the exclusive OR operation, and if peak values of the result of the operation is an all-1 digital sequence, it is proved that a pseudocode signal corresponding to a state machine of a receiving end in the current period of time is the same as a pseudocode signal corresponding to the state machine of the transmitting end in the current period of time, so that the pseudocode signal corresponding to the current status of the receiving end is obtained.

It is assumed that in the T1 period of time, the logical operation is performed on the encrypted pilot optical signal 00010110001011000101110110110010 with pseudocode signals stored by the N registers one by one; then, by means of relevant peak recognition, a 32-bit all-"1" sequence may be obtained, so that a pseudocode signal used for encryption is obtained, that is, the pseudocode signal stored in the register 1 is 11101001110100111010001001001101.

S509: The receive and control system decrypts the encrypted original signal by using the pseudocode signal corresponding to the current status, to obtain an original signal.

For example, the logical operation is performed on the pseudocode signal 11101001110100111010001001001101 with encrypted ID data 11101001110100111010001001001011 to obtain a decrypted ID data, that is, 00000000000000000000000000000110, so that the original signal is obtained.

It is assumed that when the T2 period of time arrives, the baseband signal of the transmitting end 1 is still 00000000000000000000000000000110111111111111111111111111111111. However, at this moment, the state machine of the transmitting end 1 is in the state 2. If a pseudocode signal corresponding to the state 2 is 10101101010010101100110101101010, the logical operation thereof, that is, an exclusive OR process, is shown in Table 9.

TABLE 9

Logical operation process of an original signal of a transmitting end 1 in a T2 unit time

| Original signal   | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |
|---|---|---|---|---|---|---|---|---|---|---|---|---|---|---|---|---|---|---|---|---|---|---|---|---|---|---|---|---|---|---|---|---|
| Pseudocode signal | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 0 | 1 | 0 |
| Output signal     | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 1 | 0 | 0 |

It may be learned from Table 9 that an output signal after the logical operation, that is, the encrypted original signal, is 10101101010100101011001101011100.

The logical operation on the pilot optical signal with the pseudocode signal, which is an exclusive OR process shown in Table 10.

TABLE 10

Logical operation process of a pilot optical signal of a transmitting end 1 in a T2 unit time

| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|---|
| Pseudocode signal    | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 0 | 1 | 0 |
| Output signal        | 0 | 1 | 0 | 1 | 0 | 0 | 1 | 0 | 1 | 0 | 1 | 0 | 1 | 1 | 0 | 1 | 0 | 1 | 0 | 0 | 1 | 1 | 0 | 0 | 1 | 0 | 1 | 0 | 0 | 1 | 0 | 1 |

It may be learned from Table 10 that an output signal after the logical operation, that is, the encrypted pilot optical signal, is 01010010101011010100110010100101.

From Table 9 and Table 10, it may be obtained that the pseudocode signal transmitted by the transmitting end in the T2 unit time is 10101101010100101011001101011100010100101010110101000110010100101.

In the T2 period of time, the register 1 of the receiving end still stores the ID number: 00000000000000000000000000000110. Because a status change of the receiving end is the same as that of the transmitting end, status of the register 1 at this moment also synchronously changes to the state 2, and like the state 2 of the transmitting end, uses the pseudocode signal 10101101010100101011001101011010. According to the receiving processing procedure and method described above, the receiving end can also identify the pseudocode signal used for encryption, and decrypted ID data can also be consistent with stored ID data and is a legal signal.

If a signal replicated in the T1 period of time, that is, 1110100111010011101000100100101100010110001011000101110110110010, is identified in the T2 period of time by the receiving end; then, in a pseudocode determiner, it can be identified that a used pseudocode signal is a pseudocode signal used in the state 1, that is, 11101001110100111010001001001101, and a register that stores the pseudocode signal is X but not the register 1. Because an ID number stored by each register is unique, the ID number stored by the register X cannot be 00000000000000000000000000000110. However, when a pseudocode signal identified by the pseudocode determiner is used to decrypt an ID of a replicated signal, an obtained ID is 00000000000000000000000000000110, that is, an incorrect ID is obtained. Therefore, information replicated in a process of optical signal transmission cannot be identified by the receiving end in a next period of time, and becomes expired information, thereby improving security of a photonic Internet of Things.

In Embodiment 5, for the step in which the transmitting end performs a logical operation on the original signal and the pilot optical signal separately with the pseudocode signal of the current period of time, the exclusive OR operation is used as an example for description. In a specific implementation process, another logical operation, for example, a logical AND operation may further be included, which is not described herein again.

Embodiment 6

Figure 6:
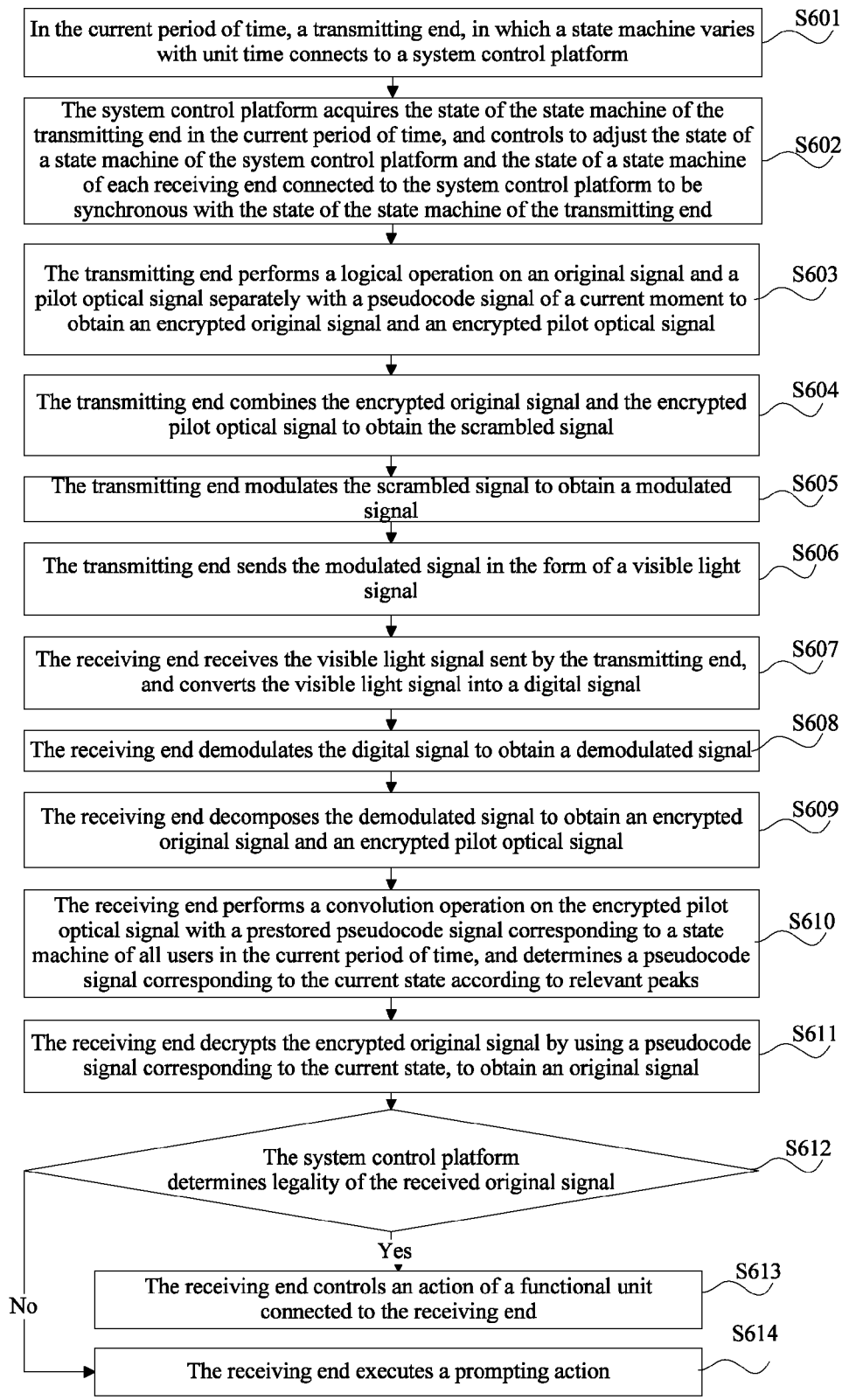
FIG. 6 is a flowchart of a handshake synchronization method for a visible light signal according to Embodiment 6 of the disclosure.

Referring to FIG. 6, FIG. 6 is a flowchart of a handshake synchronization method based on visible light communication according to Embodiment 6 of the disclosure. The method includes:

S601: A transmitting end in which a state machine varies with unit time connects to a system control platform.

Specifically, the state machine of the transmitting end keeps changing with the unit time. When in a certain period of time, the state machine of the transmitting end is exactly in an $N^{th}$ state. The transmitting end is connected to the system control platform.

By performing this step, the transmitting end and the system control platform implements a handshake.

S602: The system control platform adjusts status of a state machine of the system control platform and status of a state machine of each receiving end connected to the system control platform to be synchronous with status of the state machine of the transmitting end.

S603: The transmitting end performs a logical operation on an original signal and a pilot optical signal separately with a pseudocode signal of the current period of time to obtain an encrypted original signal and an encrypted pilot optical signal.

The pseudocode signal varies with the unit time. The pseudocode signal of the current period of time is discarded in a next period of time, and a new pseudocode signal is used. Frequencies of the original signal, the pilot optical signal, and the pseudocode signal are the same or in an integer multiple relationship, and start and end phases of the original signal, the pilot optical signal, and the pseudocode signal are the same.

S604: The transmitting end combines the encrypted original signal and the encrypted pilot optical signal to obtain the scrambled signal.

For example, an encrypted original signal 11101001110100111010001001001011 and an encrypted pilot optical signal 00010110001011000101110110110010 are combined to obtain the scrambled signal 1110100111010011101000100100101100010110001011000101110110110010.

S605: The transmitting end modulates the scrambled signal to obtain a modulated signal. S606: The transmitting end sends the modulated signal in the form of a visible light signal. For example, the transmitting end sends the modulated signal in a blinking form by using an LED lamp.

S607: The receiving end receives the visible light signal sent by the transmitting end, and converts the visible light signal into a digital signal.

S608: The receiving end demodulates the digital signal to obtain a demodulated signal. S609: The receiving end decomposes the demodulated signal to obtain an encrypted original signal and an encrypted pilot optical signal.

S610: The receiving end performs a convolution operation on the encrypted pilot optical signal with a prestored pseudocode signal corresponding to a state machine of all users in the current period of time, and determines a pseudocode signal corresponding to current status according to relevant peaks.

For example, status of a register 1 of the receiving end in a T1 period of time is a state 1, that is, the pseudocode signal is 11101001110100111010001001001101. In this case, the encrypted pilot optical signal is 00010110001011000101110110110010, and the convolution operation is performed on the encrypted pilot optical signal with the random code. By means of relevant peak recognition, a 32-bit all-"1" sequence may be obtained, which indicates that the pseudocode signal is a pseudocode signal used for encryption. The logical operation on the encrypted pilot optical signal with the pseudocode signal, which is an exclusive OR process shown in Table 11.

TABLE 11

Logical operation process of an encrypted pilot optical signal of a receiving end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Encrypted pilot optical signal | 0 | 0 | 0 | 1 | 0 | 1 | 1 | 0 | 0 | 0 | 1 | 0 | 1 | 1 | 0 | 0 | 0 | 1 | 0 | 1 | 1 | 1 | 0 | 1 | 1 | 0 | 1 | 1 | 0 | 0 | 1 | 0 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

S611: The receiving end decrypts the encrypted original signal by using the pseudocode signal corresponding to the current status, to obtain an original signal.

For example, the logical operation is performed on the encrypted original signal 11101001110100111010001001001011 with the pseudocode signal 11101001110100111010001001001101, which is an exclusive OR process shown in Table 12.

TABLE 12

Logical operation process of an encrypted pilot optical signal of a receiving end 1 in a T1 unit time

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Encrypted original signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 0 | 1 | 1 |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |

It may be learned from Table 12 that a decrypted original signal, that is, an ID signal, is 00000000000000000000000000000110.

S612: The system control platform compares a decrypted original signal with a prestored original signal of all users, and determines legality of the received original signal. If the received original signal is legal, perform S613; otherwise, perform S614.

In a specific implementation process, S612 may also be replaced by the following step: The receiving end compares a decrypted original signal with a prestored original signal, and determines legality of a received original signal. For example, the decrypted original signal is 00000000000000000000000000000110 and the prestored original signal is also 00000000000000000000000000000110, it is determined that the received original signal is legal.

If a signal replicated in the T1 period of time, that is, 111010011101001110100010010010110001011000101100 0101110110110010, is identified in the T2 period of time by the receiving end; then, in a pseudocode determiner, it can be identified that a used pseudocode signal is a pseudocode signal used in the state 1, that is, 11101001110100111010001001001101, and a register that stores the pseudocode signal is X but not the register 1. Because an ID number stored by each register is unique, the ID number stored by the register X cannot be 00000000000000000000000000000110. However, when a pseudocode signal identified by the pseudocode determiner is used to decrypt an ID of a replicated signal, an obtained ID is 00000000000000000000000000000110, that is, an incorrect ID is obtained. Therefore, if the two signals are different when ID comparison is performed in an ID determiner, it may be determined that the received original signal is an illegal signal.

S613: The receiving end controls an action of a functional unit connected to the receiving end. For example, the receiving end controls a door access control system to perform an unlocking action, or control to power on a household appliance and enter a working state.

S614: The receiving end executes a prompting action, for example, sends a text prompt or a voice prompt.

In the foregoing synchronization method, even if a visible light signal transmitted by a transmitting end is shot by a high-speed camera and then replicated, a replicated signal cannot be synchronous with a status change of a receiving end. Therefore, in a different time, even if the replicated signal is used to attempt to identify the receiving end, it can be determined that the replicated signal is an illegal signal, so that security of a photonic Internet of Things can be improved.

The foregoing describes the method embodiments of the disclosure. The following describes in detail exemplary embodiments of a hardware system for running the foregoing method embodiments.

Embodiment 7

Figure 7:
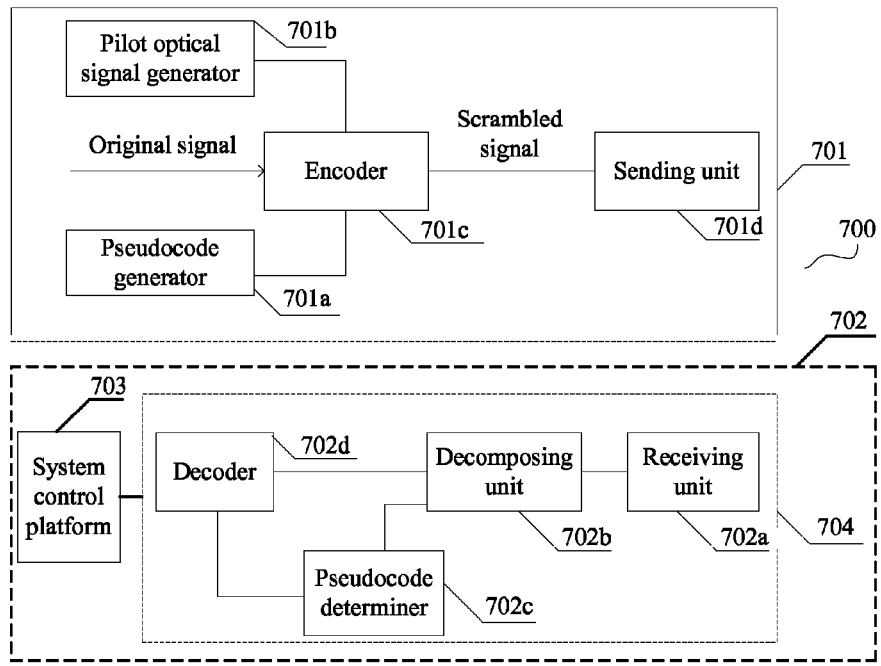
FIG. 7 is a schematic structural diagram of a handshake synchronization system for a visible light signal according to Embodiment 7 of the disclosure.

Referring to FIG. 7, FIG. 7 is a schematic structural diagram of a handshake synchronization system based on visible light communication according to Embodiment 7 of the disclosure. The system 700 includes a transmitting end 701 and a receive and control system 702, where the receive and control system 702 includes a system control platform 703, and at least one receiving end 704 connected to the system control platform.

A state machine of the transmitting end 701 varies with unit time, and in a preset period of time, the transmitting end 701 connects to the receive and control system 702 to implement a handshake. The transmitting end 701 includes a pseudocode generator 701a, a pilot optical signal generator 701b, an encoder 701c, and a light emitting unit 701d.

The pseudocode generator 701a is configured to generate and output a pseudocode signal which varies with unit time. Working status of the pseudocode generator 701a varies with the unit time, and the output pseudocode signal also varies with the unit time. For example, in a T1 unit time, the status of the pseudocode generator 701a is a state 1, and the output pseudocode signal is 11101001110100111010001001001101; and in a T2 period of time, the status of the pseudocode generator 701a is a state 2, and the output pseudocode signal is 10101101010100101011001101011010.

The pilot optical signal generator 701b is configured to output a pilot optical signal. A frequency of the pilot optical signal generator 701b and a working frequency of the pseudocode generator are the same or in an integer multiple relationship.

The encoder 701c, which is connected to the pilot optical signal generator 701b and the pseudocode generator 701a, is configured to perform a logical operation on an original signal and an optical signal, which is output by the pilot optical signal generator 701b, separately with a pseudocode signal output by the pseudocode generator 701a in the current period of time to obtain an encrypted original signal and an encrypted pilot optical signal. The encrypted original signal and the encrypted pilot optical signal are combined to obtain the scrambled signal. For example, an encrypted original signal 11101001110100111010001001001011 and an encrypted pilot optical signal 00010110001011000101110110110010 are combined to obtain the scrambled signal 111010011101001110100010010010110001011000101100 0101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination.

The light emitting unit 701d connected to the encoder 701c is configured to send, in a form (a blinking form) of a visible light signal, the scrambled signal output by the encoder 701c. The sending unit 701c may be a light emitting diode, and may also be another component that has a light emitting function.

The transmitting end 701 may be a dedicated photon client, a mobile phone, or a handheld electronic device that has a function of transmitting a visible light signal.

The receive and control system 702 includes a system control platform 703, and at least one receiving end 704 connected to the system control platform 703. The receiving end 704 is synchronous with status of a state machine of the transmitting end in the current period of time. After the state machine of the transmitting end 701 is synchronous with a state machine of the receiving end 704, the status of the state machine of the receiving end 704 varies with the unit time as the status of the state machine of the transmitting end 701.

The receiving end 704 includes a receiving unit 702a, a decomposing unit 702b, a pseudocode determiner 702c, and a decoder 702d.

The receiving unit 702a receives the visible light signal transmitted by the transmitting end 701a, and converts the visible light signal into a digital signal.

The decomposing unit 702b connected to the receiving unit 702a is configured to decompose the digital signal obtained by conversion by the receiving unit 702a to obtain an encrypted original signal and an encrypted pilot optical signal.

The decomposing unit 702b is connected to the pseudocode determiner 702c. The pseudocode determiner performs a logical operation on the encrypted pilot optical signal with a prestored pseudocode signal corresponding to a state machine of all users in a photonic Internet of Things system in the current period of time, for example, after a convolution operation, determines a pseudocode signal corresponding to current status according to relevant peaks.

The decoder 702d, which is connected to the decomposing unit 702b and the pseudocode determiner 702c, is configured to use the pseudocode signal output by the pseudocode determiner 702c to decrypt the encrypted original signal, which is output by the decomposing unit 702b, to obtain an original signal. In a specific implementation process, the decoder 702d has a buffering function, which is used to buffer an encrypted original signal output by the decomposing unit 702b, or a buffering unit is connected between the decomposing unit 702b and the decoder 702d and configured to buffer an encrypted original signal output by the decomposing unit 702b.

In a specific implementation process, an ID determiner connected to the decoder 702d, and a specific device connected to the determiner, for example, a door lock, a household appliance, or the like may further be included.

Embodiment 8

Figure 8:
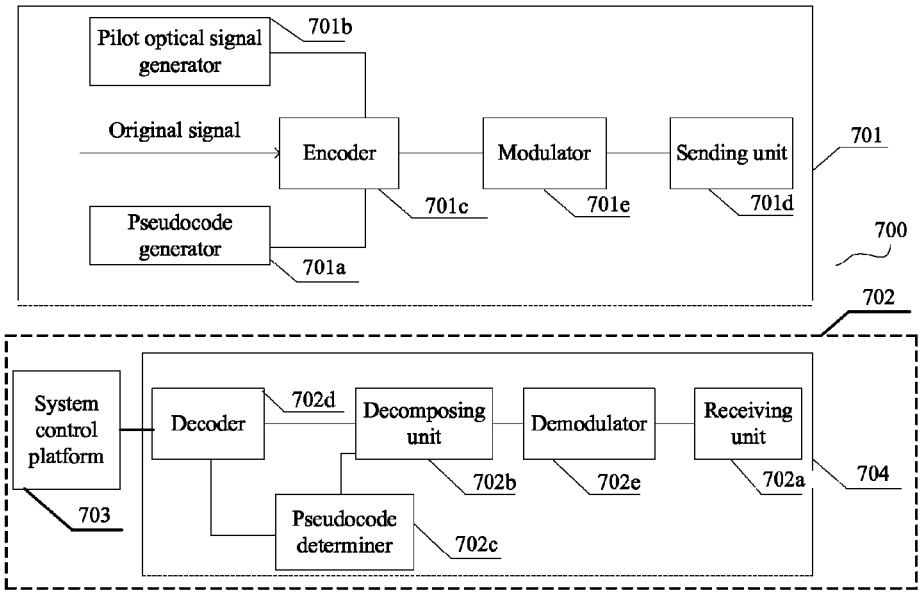
FIG. 8 is a schematic structural diagram of a handshake synchronization system for a visible light signal according to Embodiment 8 of the disclosure.

Referring to FIG. 8, FIG. 8 is a schematic structural diagram of a handshake synchronization system for a visible light signal according to Embodiment 8 of the disclosure.

Compared with Embodiment 7, the transmitting end 701 further includes:

a modulator 701e, connected between the encoder 701c and the sending unit 701d, and configured to modulate the scrambled signal.

Correspondingly, the receiving end 702 further includes:

a demodulator 702e, connected between the receiving unit 702a and the decomposing unit 702b, and configured to demodulate the digital signal output by the receiving unit 702a.

Embodiment 9

Figure 9:
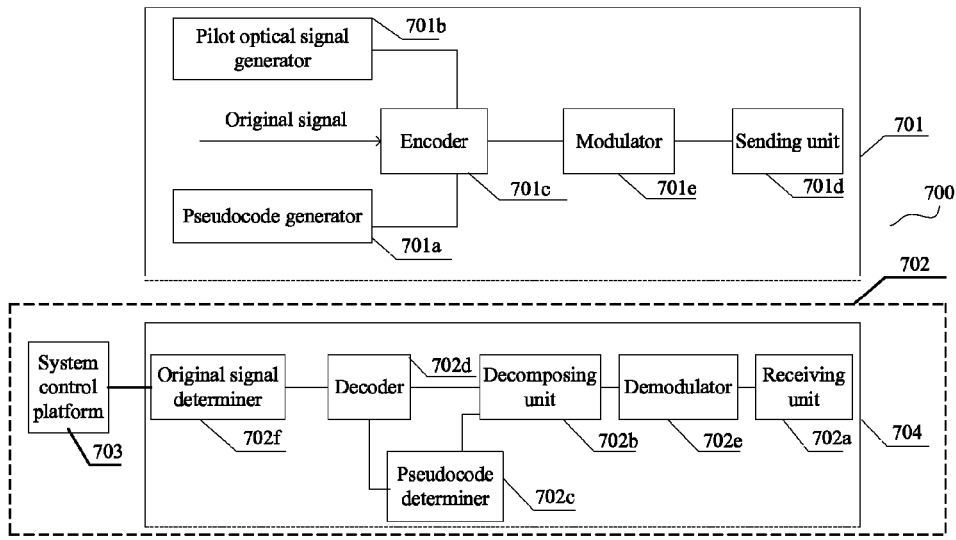
FIG. 9 is a schematic structural diagram of a handshake synchronization system for a visible light signal according to Embodiment 9 of the disclosure.

Referring to FIG. 9, FIG. 9 is a schematic structural diagram of a handshake synchronization system for a visible light signal according to Embodiment 9 of the disclosure. Compared with Embodiment 8, the receiving end 702 further includes:

an original signal determiner 702f, connected to the decoder 702d and the pseudocode determiner 702c, and configured to compare a decrypted original signal with an original signal prestored in the pseudocode determiner and determine legality of a received original signal. In a specific implementation process, the original signal determiner 702f has a buffering function, which is used to buffer an original signal output by the pseudocode determiner 702c, or a buffer may be connected between the pseudocode determiner 702c and the original signal determiner 702f, and the original signal output by the pseudocode determiner 702c by using the buffer.

In a specific implementation process, the synchronization system 700 further includes a functional unit connected to the receiving unit 702a, for example, an electric lock, or the like.

Embodiment 10

Figure 10:
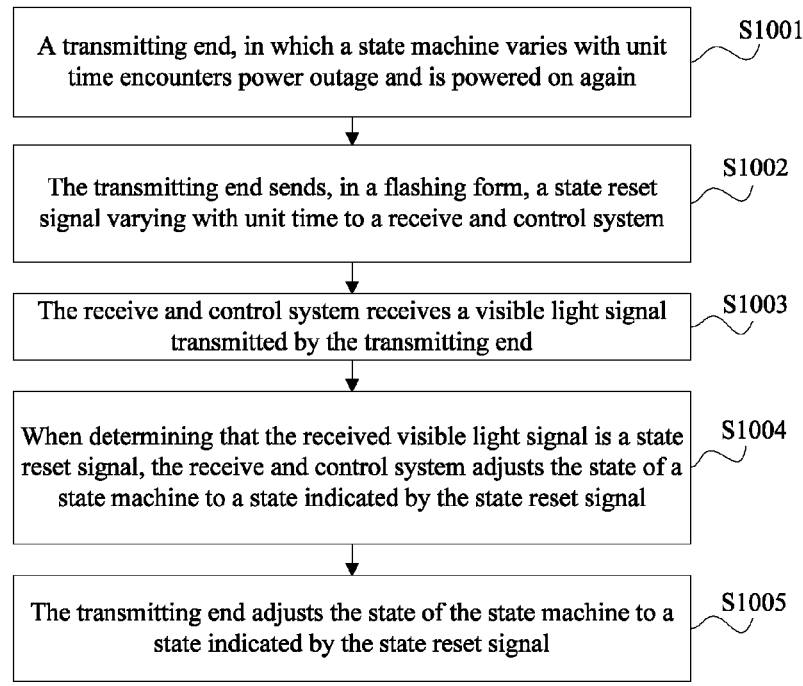
FIG. 10 is a flowchart of a handshake synchronization restoration method according to Embodiment 10 of the disclosure.

Referring to FIG. 10, FIG. 10 is a flowchart of a handshake synchronization restoration method according to Embodiment 10 of the disclosure. The handshake synchronization restoration method includes:

S1001: A transmitting end in which a state machine varies with unit time encounters power outage and is powered on again.

S1002: The transmitting end sends, in a blinking form, a status reset signal varying with unit time to a receive and control system.

The status reset signal is formed by three parts: a status reset code, a status indication code, and an original signal (for example, an ID). The reset code has a unique value, and has a same length as a pilot optical signal. The status indication code is a random number, and used to instruct a photon receiving end to use a pseudocode sequence of which state. The status reset signal, after being modulated by a modulator, is transmitted by an LED.

S1003: The receive and control system receives a visible light signal transmitted by the transmitting end.

S1004: When determining that the received visible light signal is a status reset signal, the receive and control system adjusts status of a state machine to a state indicated by the status reset signal.

S1005: The transmitting end adjusts status of the state machine to a state indicated by the status reset signal.

S1004 and S1005 occur at the same time.

Specifically, the receive and control system determines whether the visible light signal is a status reset signal by using a status reset determiner; and if yes, splits the status indication code from the ID, and resets status of a register, corresponding to an ID number, in a pseudocode determiner to a state indicated by the status indication code.

Hereto, handshake synchronization is restored between the transmitting end and the receive and control system. Then, pseudocode generators of both sides make a same change along with time. The status indication code is a random number, which is random, and only indicates a state used when status of the transmitting end and the receive and control system are reset. Therefore, even if this status code is obtained by shooting by a high-speed camera, a pseudocode sequence in use cannot be obtained. When status reset is performed for the next time, the status indication code changes to another value, and the pseudocode sequence in use also changes accordingly. Therefore, a signal replicated by shooting by the high-speed camera becomes invalid, thereby improving security of a photonic Internet of Things.

Embodiment 11

Figure 11:
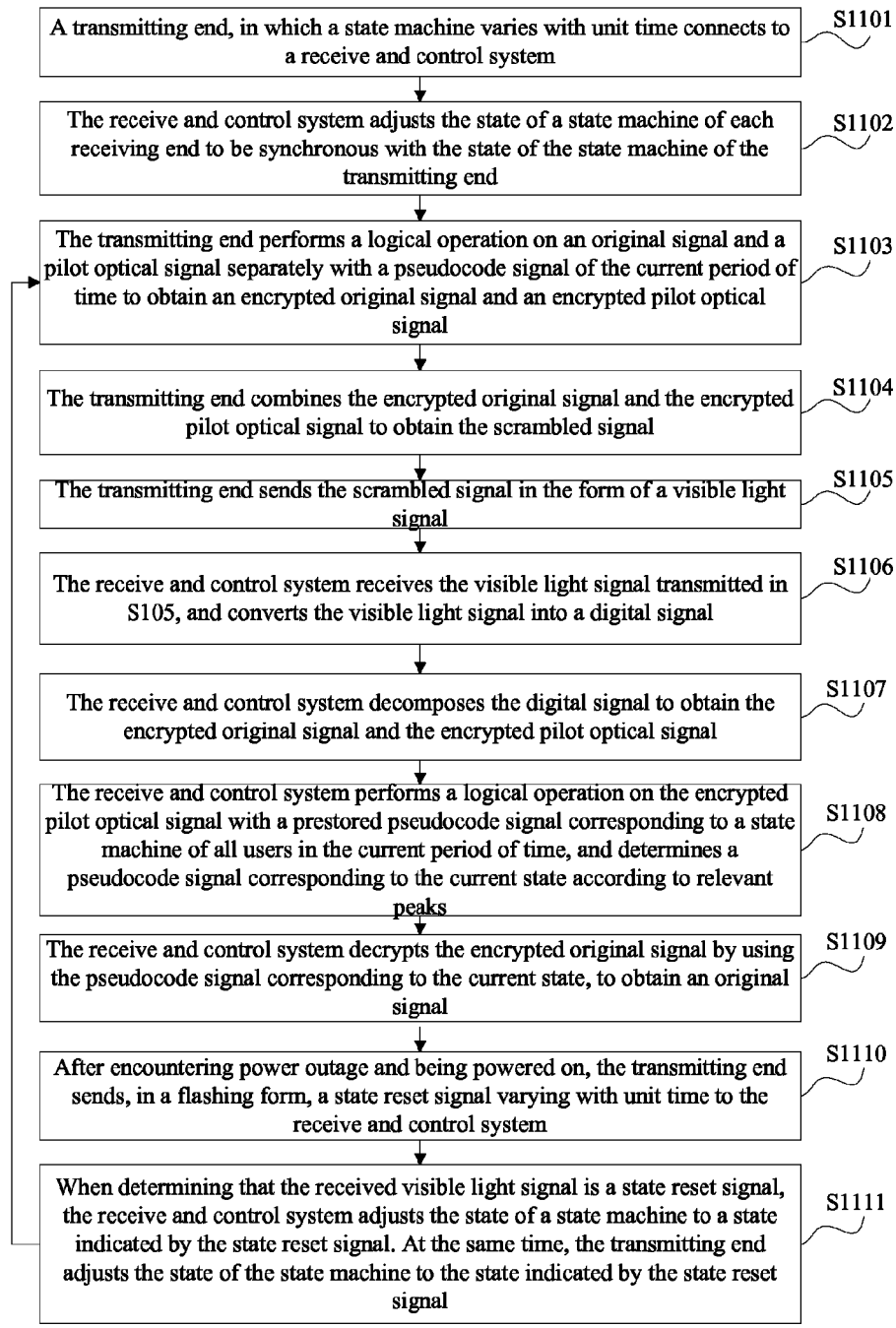
FIG. 11 is a flowchart of a handshake synchronization restoration method according to Embodiment 11 of the disclosure.

Referring to FIG. 11, FIG. 11 is a flowchart of a handshake synchronization restoration method provided by Embodiment 11 of the disclosure. The handshake synchronization restoration method includes:

S1101: A transmitting end in which a state machine varies with unit time connects to a receive and control system.

By performing this step, the transmitting end and the receive and control system implements a handshake.

The receive and control system includes a system control platform, and each receiving end connected to the system control platform.

Specifically, the state machine of the transmitting end keeps changing with the unit time. When in a certain period of time, the state machine of the transmitting end is exactly in an N<sup>th</sup> state. The transmitting end is connected to the system control platform.

S1102: The receive and control system adjusts status of a state machine of each receiving end to be synchronous with status of the state machine of the transmitting end.

Specifically, the system control platform adjusts status of a state machine of the system control platform and the status of the state machine of each receiving end to be synchronous with the status of the state machine of the transmitting end, for example, to be in the $N^{th}$ state.

S1103: The transmitting end performs a logical operation on an original signal and a pilot optical signal separately with a pseudocode signal of the current period of time to obtain an encrypted original signal and an encrypted pilot optical signal.

Frequencies of the original signal, the pilot optical signal, and the pseudocode signal are the same or in an integer multiple relationship, and start and end phases of the original signal, the pilot optical signal, and the pseudocode signal are the same.

The original signal is a digital sequence signal, also called baseband data, and may include an ID number. The ID number herein refers to a unique identification code of each transmitting end, and may be binary digits of 8 bits, 16 bits, 24 bits, 32 bits, or the like. If a photonic Internet of Things has M transmitting ends, a baseband signal of each transmitting end is an ID number of the transmitting end. In addition, status of a pseudocode generator of each transmitting end is determined according to both a current time and an ID. If the pseudocode generator also has N states, and each state corresponds to one unique pseudocode signal, in a T1 period of time, a photon transmitter 1 corresponds to a state 1, a photon transmitter 2 corresponds to a state 2, . . . , a photon transmitter M corresponds to a state N; however, in a T2 period of time, the photon transmitter 1 corresponds to the state 2, the photon transmitter 2 corresponds to the state 2, . . . , the photon transmitter M corresponds to the state 1; and so on. In this way, it may be ensured that in a same period of time, a pseudocode signal generated by each transmitting end is different. For a same transmitting end, pseudocode signals generated in different period of times are also different. The pilot optical signal is generated by a pilot optical signal generator and is a group of all-"1" binary digits of 8 bits, 16 bits, 24 bits, 32 bits, or the like.

For example, in a T1 time, it is assumed that a baseband signal of a transmitting end 1 is 0000000000000000000000000000011011111111111111111111111111111111, totaling 64 bits, where the first 32 bits are an ID number of the transmitting end 1, that is, 00000000000000000000000000000110; and the last 32 bits are an all-1 pilot optical signal. In a T1 unit time, status of a pseudocode generator is a state 1, and is assumed to be 11101001110100111010001001001101; then, the logical operation thereof, that is, an exclusive OR process, is shown in Table 13.

TABLE 13

Logical operation process of an original signal of a transmitting end 1 in a T1 unit time

| Original signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |
|---|---|---|---|---|---|---|---|---|---|---|---|---|---|---|---|---|---|---|---|---|---|---|---|---|---|---|---|---|---|---|---|---|
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 0 | 1 | 1 |

It may be learned from Table 13 that a convoluted output signal, that is, the encrypted original guide signal is 11101001110100111010001001001011.

The logical operation on the pilot optical signal with the pseudocode signal, which is an exclusive OR process shown in Table 14.

TABLE 14

Logical operation process of a pilot optical signal of a transmitting end 1 in a T1 unit time

| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|---|
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 0 | 0 | 0 | 1 | 0 | 1 | 1 | 0 | 0 | 0 | 1 | 0 | 1 | 1 | 0 | 0 | 0 | 1 | 0 | 1 | 1 | 1 | 0 | 1 | 1 | 0 | 1 | 1 | 0 | 0 | 1 | 0 |

It may be learned from Table 14 that an output signal after the logical operation, that is, the encrypted pilot optical signal is 00010110001011000101110110110010.

S1104: The transmitting end combines the encrypted original signal and the encrypted pilot optical signal to obtain the scrambled signal.

For example, an encrypted original signal 11101001110100111010001001001011 and an encrypted pilot optical signal 00010110001011000101110110110010 are combined to obtain the scrambled signal 1110100111010011101000100100101100010110001011000101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination. Other examples are not described herein one by one.

S1105: The transmitting end sends the scrambled signal in the form of a visible light signal.

It is assumed that ID represents an ID signal of the transmitting end, PW represents a pilot optical signal of the transmitting end, and PN represents a pseudocode signal; then, the output scrambled signal S may be represented by S=ID*PN+PW*PN. If a signal transmitted at this moment by the transmitting end is shot for duplication by a high-speed camera, a replicated signal is also 11101001110100111010001001001011000101100010101100 0101110110110010.

S1106: The receive and control system receives the visible light signal transmitted in S1105, and converts the visible light signal into a digital signal.

Specifically, a receiving end in the receive and control system receives the visible light signal transmitted by the transmitting end, converts an optical signal into a current signal, converts the current signal into a voltage signal, and outputs the voltage signal as a digital signal.

S1107: The receive and control system decomposes the digital signal to obtain the encrypted original signal and the encrypted pilot optical signal.

S1108: The receive and control system performs a logical operation on the encrypted pilot optical signal with a prestored pseudocode signal corresponding to a state machine of all users in the current period of time, and determines a pseudocode signal corresponding to current status according to relevant peaks.

S1108 may be implemented by a receiving end that receives the visible light signal, and may also be implemented by the system control platform.

For example, receiving ends of the receive and control system, like the transmitting end, also have a same state machine and status of the state machine also keeps changing with time. A difference lies in that: each transmitting end in a period of time corresponds only to one state, which changes to another state after this period of time elapses, that is, only one group of pseudocode signals is generated, and this pseudocode varies with time. However, at the receiving end, M transmitting ends exist, that is, M users exist. A receiving and control end has N states, that is, has N groups of pseudocode signals, and each group of pseudocode signals is different. The N pseudocodes are stored in N registers, and each register corresponds to a unique transmitting end, that is, each register stores an ID of a fixed transmitting end and a pseudocode signal that varies with time, for example, a register 1 always stores an ID of a transmitting end 1, and a register 2 always stores an ID of a transmitting end 2. A pseudocode signal stored by each register corresponds to a pseudocode signal in the transmitting end one by one and is determined by time and keeps changing with time. For example, in the T1 period of time, the register 1 corresponds to the state 1, the register 2 corresponds to the state 2, . . . , a register N corresponds to a state N; however, in the T2 period of time, the register 1 corresponds to the state 2, the register 2 corresponds to the state 2, . . . , the register N corresponds to the state 1; and so on.

The relevant peaks refers to peak values of a group of digital sequences obtained after the logical operation on the encrypted pilot optical signal with the pseudocode signal. For example, the encrypted pilot optical signal is a result of an exclusive OR operation of an all-"1" digital sequence with the pseudocode signal. If the encrypted pilot optical signal and a prestored pseudocode signal corresponding to a state machine of all users in the current period of time are traversed for the exclusive OR operation, and if peak values of the result of the operation is an all-1 digital sequence, it is proved that a pseudocode signal corresponding to a state machine of a receiving end in the current period of time is the same as a pseudocode signal corresponding to the state machine of the transmitting end in the current period of time, so that the pseudocode signal corresponding to the current status of the receiving end is obtained.

It is assumed that in the T1 period of time, the logical operation is performed on the encrypted pilot optical signal 00010110001011000101110110110010 with pseudocode signals stored by the N registers one by one; then, by means of relevant peak recognition, a 32-bit all-"1" sequence may be obtained, so that a pseudocode signal used for encryption is obtained, that is, the pseudocode signal stored in the register 1 is 11101001110100111010001001001101.

S1109: The receive and control system decrypts the encrypted original signal by using the pseudocode signal corresponding to the current status, to obtain an original signal.

For example, the logical operation is performed on the pseudocode signal 11101001110100111010001001001101 with encrypted ID data 11101001110100111010001001001011 to obtain a decrypted ID data, that is, 00000000000000000000000000000110, so that the original signal is obtained.

It is assumed that when the T2 period of time arrives, the baseband signal of the transmitting end 1 is still 00000000000000000000000000000001101111111111111111 1111111111111111. However, at this moment, the state machine of the transmitting end 1 is in the state 2. If a pseudocode signal corresponding to the state 2 is 10101101010100101011001101011010, the logical operation thereof, that is, an exclusive OR process, is shown in Table 15.

TABLE 15

Logical operation process of an original signal of a transmitting end 1 in a T2 unit time

| Original signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |
|---|---|---|---|---|---|---|---|---|---|---|---|---|---|---|---|---|---|---|---|---|---|---|---|---|---|---|---|---|---|---|---|---|
| Pseudocode signal | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 0 | 1 | 0 |
| Output signal | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 1 | 0 | 0 |

It may be learned from Table 15 that an output signal after the logical operation, that is, the encrypted original signal is 10101101010100101011001101011100.

The logical operation on the pilot optical signal with the pseudocode signal, which is an exclusive OR process shown in Table 16.

TABLE 16

Logical operation process of a pilot optical signal of a transmitting end 1 in a T2 unit time

| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|---|
| Pseudocode signal | 1 | 0 | 1 | 0 | 1 | 1 | 0 | 1 | 0 | 1 | 0 | 1 | 0 | 0 | 1 | 0 | 1 | 0 | 1 | 1 | 0 | 0 | 1 | 1 | 0 | 1 | 0 | 1 | 1 | 0 | 1 | 0 |
| Output signal | 0 | 1 | 0 | 1 | 0 | 0 | 1 | 0 | 1 | 0 | 1 | 0 | 1 | 1 | 0 | 1 | 0 | 1 | 0 | 0 | 1 | 1 | 0 | 0 | 1 | 0 | 1 | 0 | 0 | 1 | 0 | 1 |

It may be learned from Table 16 that an output signal after the logical operation, that is, the encrypted pilot optical signal is 01010010101011010100110010100101.

From Table 15 and Table 16, it may be obtained that the pseudocode signal transmitted by the transmitting end in the T2 unit time is 1010110101010010101100110101110001010010101011010100110010100101.

In the T2 period of time, the register 1 of the receiving end still stores the ID number: 00000000000000000000000000000110. Because a status change of the receiving end is the same as that of the transmitting end, status of the register 1 at this moment also synchronously changes to the state 2, and like the state 2 of the transmitting end, uses the pseudocode signal 10101101010100101011001101011010. According to the receiving processing procedure and method described above, the receiving end can also identify the pseudocode signal used for encryption, and decrypted ID data can also be consistent with stored ID data and is a legal signal.

If a signal replicated in the T1 period of time, that is, 11101001110100111010001001001011000101100001011101100010, is identified in the T2 period of time by the receiving end; then, in a pseudocode determiner, it can be identified that a used pseudocode signal is a pseudocode signal used in the state 1, that is, 11101001110100111010001001001101, and a register that stores the pseudocode signal is X but not the register 1. Because an ID number stored by each register is unique, the ID number stored by the register X cannot be 00000000000000000000000000000110. However, when a pseudocode signal identified by the pseudocode determiner is used to decrypt an ID of a replicated signal, an obtained ID is 00000000000000000000000000000110, that is, an incorrect ID is obtained. Therefore, information replicated in a process of optical signal transmission cannot be identified by the receiving end in a next period of time, and becomes expired information, thereby improving security of a photonic Internet of Things.

S1010: After encountering power outage and being powered on again, the transmitting end sends, in a blinking form, a status reset signal varying with unit time to the receive and control system.

The status reset signal is formed by three parts: a status reset code, a status indication code, and an original signal (for example, an ID). The reset code has a unique value, and has a same length as a pilot optical signal. The status indication code is a random number, and used to instruct a photon receiving end to use a pseudocode sequence of which state. The status reset signal, after being modulated by a modulator, is transmitted by an LED.

S1011: When determining that the received visible light signal is a status reset signal, the receive and control system adjusts status of a state machine to a state indicated by the status reset signal. At the same time, the transmitting end adjusts the status of the state machine to the state indicated by the status reset signal, and returns to S1103.

In this embodiment, for the step in which the transmitting end performs a logical operation on the original signal and the pilot optical signal separately with the pseudocode signal of the current period of time, the exclusive OR operation is used as an example for description. In a specific implementation process, another logical operation, for example, a logical AND operation may further be included, which is not described herein again.

Embodiment 12

Figure 12:
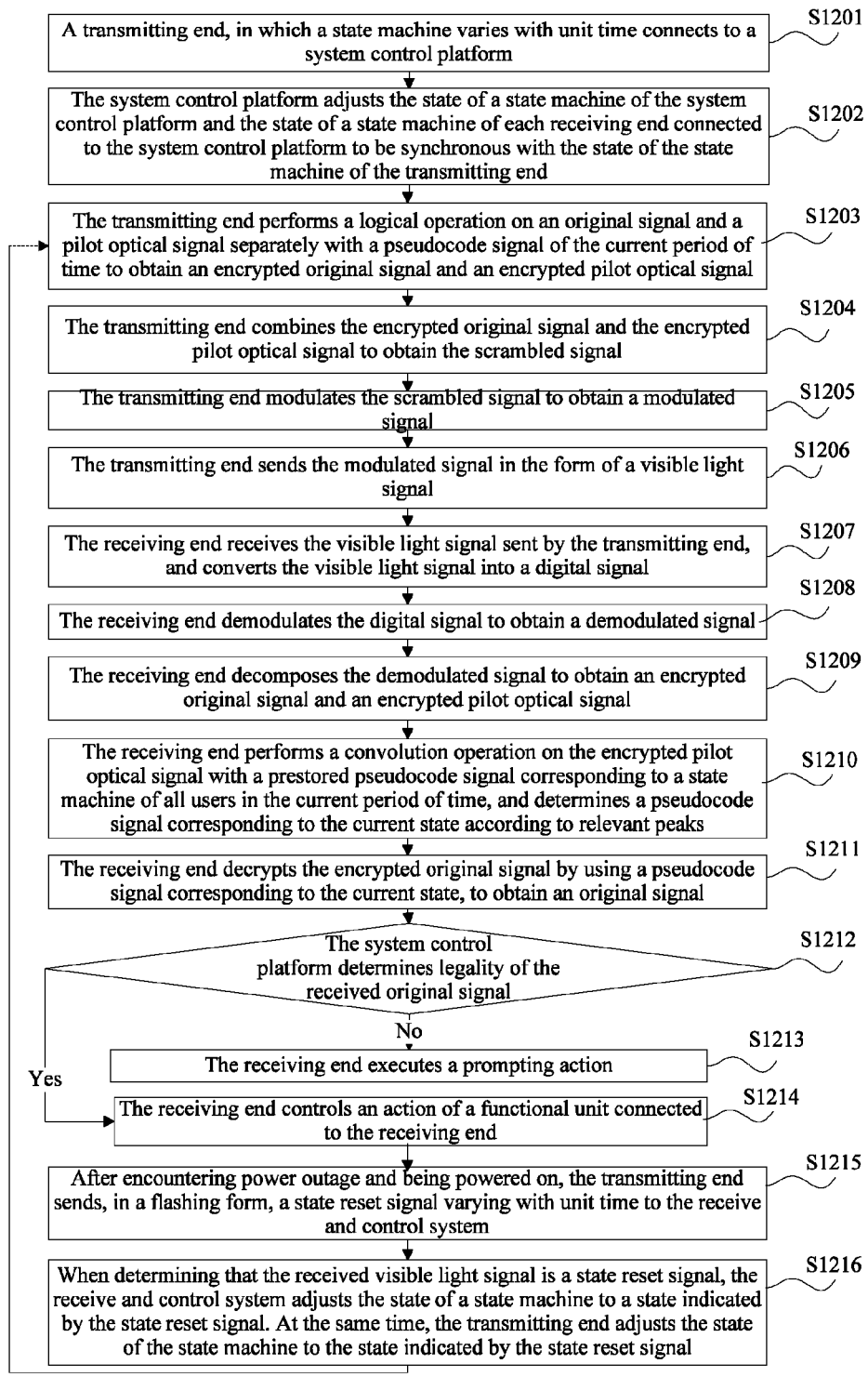
FIG. 12 is a flowchart of a handshake synchronization restoration method according to Embodiment 12 of the disclosure.

Referring to FIG. 12, FIG. 12 is a flowchart of a handshake synchronization method based on visible light communication according to Embodiment 12 of the disclosure. The method includes:

S1201: A transmitting end in which a state machine varies with unit time connects to a system control platform.

Specifically, the state machine of the transmitting end keeps changing with the unit time. When in a certain period of time, the state machine of the transmitting end is exactly in an $N^{th}$ state. The transmitting end is connected to the system control platform.

By performing this step, the transmitting end and the system control platform implements a handshake.

S1202: The system control platform adjusts status of a state machine of the system control platform and status of a state machine of each receiving end connected to the system control platform to be synchronous with status of the state machine of the transmitting end.

S1203: The transmitting end performs a logical operation on an original signal and a pilot optical signal separately with a pseudocode signal of the current period of time to obtain an encrypted original signal and an encrypted pilot optical signal.

The pseudocode signal varies with the unit time. The pseudocode signal of the current period of time is discarded in a next period of time, and a new pseudocode signal is used. Frequencies of the original signal, the pilot optical signal, and the pseudocode signal are the same or in an integer multiple relationship, and start and end phases of the original signal, the pilot optical signal, and the pseudocode signal are the same.

S1204: The transmitting end combines the encrypted original signal and the encrypted pilot optical signal to obtain the scrambled signal.

For example, an encrypted original signal 11101001110100111010001001001011 and an encrypted pilot optical signal 00010110001011000101110110110010 are combined to obtain the scrambled signal 1110100111010011101000100100101100001011101101100010 0101110110110010.

S1205: The transmitting end modulates the scrambled signal to obtain a modulated signal. S1206: The transmitting end sends the modulated signal in the form of a visible light signal. For example, the transmitting end sends the modulated signal in a blinking form by using an LED lamp.

S1207: The receiving end receives the visible light signal sent by the transmitting end, and converts the visible light signal into a digital signal.

S1208: The receiving end demodulates the digital signal to obtain a demodulated signal. S1209: The receiving end decomposes the demodulated signal to obtain an encrypted original signal and an encrypted pilot optical signal.

S1210: The receiving end performs a convolution operation on the encrypted pilot optical signal with a prestored pseudocode signal corresponding to a state machine of all users in the current period of time, and determines a pseudocode signal corresponding to current status according to relevant peaks.

For example, status of a register 1 of the receiving end in a T1 period of time is a state 1, that is, the pseudocode signal is 11101001110100111010001001001101. In this case, the encrypted pilot optical signal is 00010110001011000101110110110010, and the convolution operation is performed on the encrypted pilot optical signal with the random code. By means of relevant peak recognition, a 32-bit all-"1" sequence may be obtained, which indicates that the pseudocode signal is a pseudocode signal used for encryption. The logical operation on the encrypted pilot optical signal with the pseudocode signal, which is an exclusive OR process shown in Table 17.

It may be learned from Table 18 that the decrypted original signal, that is, an ID signal, is 00000000000000000000000000000110.

S1212: The system control platform compares a decrypted original signal with a prestored original signal of all users, and determines legality of a received original signal. If the received original signal is legal, perform S1214; otherwise, perform S1213.

In a specific implementation process, S1212 may also be replaced by the following step: The receiving end compares a decrypted original signal with a prestored original signal, and determines legality of a received original signal. For example, the decrypted original signal is 00000000000000000000000000000110 and the prestored original signal is also 00000000000000000000000000000110, it is determined that the received original signal is legal.

If a signal replicated in the T1 period of time, that is, 11101001110100111010001001001011000101100 0101110110110010, is identified in the T2 period of time by the receiving end; then, in a pseudocode determiner, it can be identified that a used pseudocode signal is a pseudocode signal used in the state 1, that is, 11101001110100111010001001001101, and a register that stores the pseudocode signal is X but not the register 1. Because an ID number stored by each register is unique, the ID number stored by the register X cannot be 00000000000000000000000000000110. However, when a pseudocode signal identified by the pseudocode determiner is used to decrypt an ID of a replicated signal, an obtained ID is

TABLE 17

Logical operation process of an encrypted pilot optical signal of a receiving end 1 in a T1 unit time

| Encrypted pilot optical signal | 0 | 0 | 0 | 1 | 0 | 1 | 1 | 0 | 0 | 0 | 1 | 0 | 1 | 1 | 0 | 0 | 0 | 1 | 0 | 1 | 1 | 1 | 0 | 1 | 1 | 0 | 1 | 1 | 0 | 0 | 1 | 0 |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Pilot optical signal | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

S1211: The receiving end decrypts the encrypted original signal by using the pseudocode signal corresponding to the current status, to obtain an original signal.

For example, the logical operation is performed on the encrypted original signal 11101001110100111010001001001011 with the pseudocode signal 11101001110100111010001001001101, which is an exclusive OR process shown in Table 18.

00000000000000000000000000000110, that is, an incorrect ID is obtained. Therefore, if the two signals are different when ID comparison is performed in an ID determiner, it may be determined that the received original signal is an illegal signal.

S1213: The receiving end executes a prompting action, for example, sends a text prompt or a voice prompt.

TABLE 18

Logical operation process of an encrypted pilot optical signal of a receiving end 1 in a T1 unit time

| Encrypted original signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 0 | 1 | 1 |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| Pseudocode signal | 1 | 1 | 1 | 0 | 1 | 0 | 0 | 1 | 1 | 1 | 0 | 1 | 0 | 0 | 1 | 1 | 1 | 0 | 1 | 0 | 0 | 0 | 1 | 0 | 0 | 1 | 0 | 0 | 1 | 1 | 0 | 1 |
| Output signal | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |

S1214: The receiving end controls an action of a functional unit connected to the receiving end. For example, the receiving end controls a door access control system to perform an unlocking action, or control to power on a household appliance and enter a working state.

S1215: After encountering power outage and being powered on again, the transmitting end sends, in a blinking form, a status reset signal varying with unit time to the receive and control system.

The status reset signal is formed by three parts: a status reset code, a status indication code, and an original signal (for example, an ID number). The reset code has a unique value, and has a same length as a pilot optical signal. The status indication code is a random number, and used to instruct a photon receiving end to use a pseudocode sequence of which state. The status reset signal, after being modulated by a modulator, is transmitted by an LED.

S1216: When determining that the received visible light signal is a status reset signal, the receive and control system adjusts status of a state machine to a state indicated by the status reset signal. At the same time, the transmitting end adjusts the status of the state machine to the state indicated by the status reset signal, and returns to S1203.

In the foregoing synchronization method, the status indication code is a random number, which is random, and only indicates a state used when status of the transmitting end and the receive and control system are reset. Therefore, even if this status code is obtained by shooting by a high-speed camera, a pseudocode sequence in use cannot be obtained. When status reset is performed for the next time, the status indication code changes to another value, and the pseudocode sequence in use also changes accordingly. Therefore, a signal replicated by shooting by the high-speed camera becomes invalid, thereby improving security of a photonic Internet of Things.

The foregoing describes the method embodiments of the disclosure. The following describes in detail exemplary embodiments of a hardware system for running the foregoing method embodiments.

Embodiment 13

Figure 13:
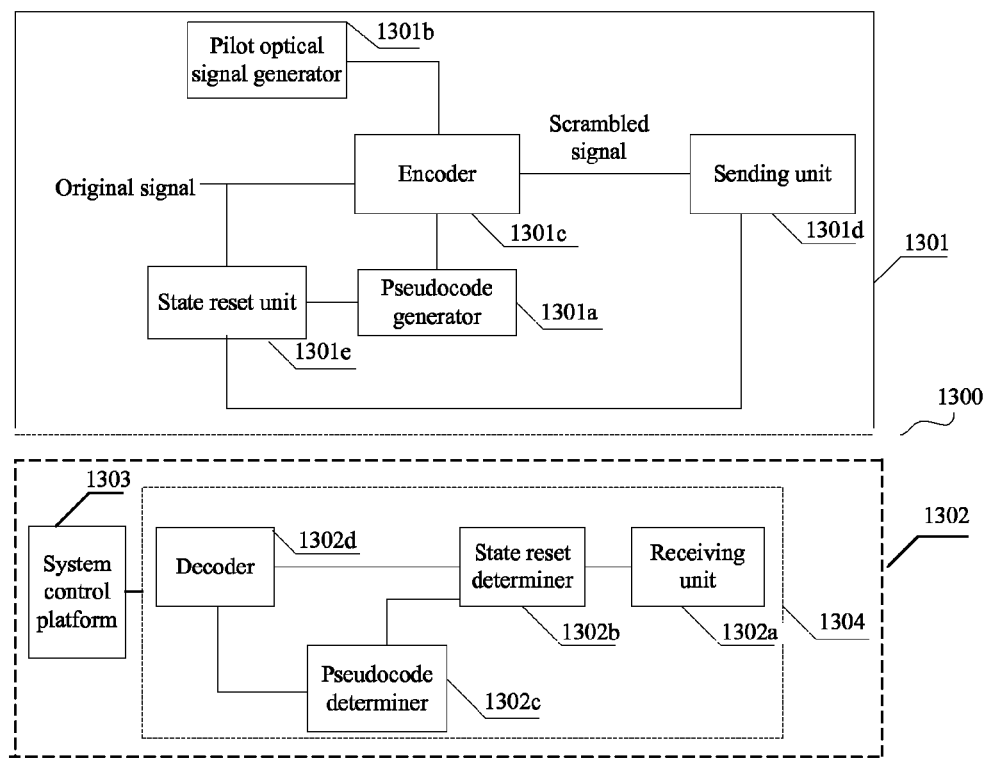
FIG. 13 is a schematic structural diagram of a handshake synchronization restoration system according to Embodiment 13 of the disclosure.

Referring to FIG. 13, FIG. 13 is a schematic structural diagram of a handshake synchronization restoration system according to Embodiment 13 of the disclosure. The system 1300 includes a transmitting end 1301 and a receive and control system 1302, where the receive and control system 1302 includes a system control platform 1303, and at least one receiving end 1304 connected to the system control platform.

A state machine of the transmitting end 1301 varies with unit time, and in a preset period of time, the transmitting end 1301 connects to the receive and control system 1302 to implement a handshake. The transmitting end 1301 includes a pseudocode generator 1301a, a pilot optical signal generator 1301b, an encoder 1301c, a light emitting unit 1301d, and a status reset unit 1301e.

The pseudocode generator 1301a is configured to generate and output a pseudocode signal which varies with unit time. Working status of the pseudocode generator 1301a varies with the unit time, and the output pseudocode signal also varies with the unit time. For example, in a T1 unit time, the status of the pseudocode generator 1301a is a state 1, and the output pseudocode signal is 11101001110100111010001001001101; and in a T2 period of time, the status of the pseudocode generator 301a is a state 2, and the output pseudocode signal is 10101101010100101011001101011010.

The pilot optical signal generator 1301b is configured to output a pilot optical signal. A frequency of the pilot optical signal generator 1301b and a working frequency of the pseudocode generator are the same or in an integer multiple relationship.

The encoder 1301c, which is connected to the pilot optical signal generator 1301b and the pseudocode generator 1301a, is configured to perform a logical operation on an original signal and an optical signal, which is output by the pilot optical signal generator 1301b, separately with a pseudocode signal output by the pseudocode generator 1301a in the current period of time to obtain an encrypted original signal and an encrypted pilot optical signal. The encrypted original signal and the encrypted pilot optical signal are combined to obtain the scrambled signal. For example, an encrypted original signal 11101001110100111010001001001011 and an encrypted pilot optical signal 00010110001011000101110110110010 are combined to obtain the scrambled signal 1110100111010011101000100100101110001011000101100 0101110110110010. Herein, the first 32 bits are an encrypted original signal and the last 32 bits are an encrypted pilot optical signal for combination. In a specific process, it may also be that the first 32 bits are an encrypted pilot optical signal and the last 32 bits are an encrypted original signal for combination.

The light emitting unit 1301d connected to the encoder 1301c is configured to send, in the form of a visible light signal, the scrambled signal output by the encoder 1301c. The sending unit 1301c may be a light emitting diode, and may also be another component that has a light emitting function.

The status reset unit 1301e, which is connected to the pseudocode generator 1301a and the light emitting unit 1301d, is configured to, after the transmitting end 1301 encounters power outage and is powered on again, transmit, by using the light emitting unit 1301d, to the receive and control system, a status reset signal which varies with unit time; and at the same time, sends a status indication signal to the pseudocode generator 1301a to instruct the pseudocode generator to use a pseudocode sequence corresponding to which state in the current period of time. The status reset signal includes: a status reset code, a status indication code, and an original signal (for example, an ID number). The reset code has a unique value, and has a same length as a pilot optical signal. The status indication signal is a random number, and is consistent with the status indication code in the status reset signal sent to the receiving end. Therefore, when the transmitting end encounters power outage and is powered on again, status of the transmitting end may be a state X, and a pseudocode sequence used for encryption also may be the pseudocode sequence corresponding to the state X.

The transmitting end 1301 may be a dedicated photon client or mobile phone, or another handheld electronic device that has a function of transmitting a visible light signal.

The receiving end 1304 is synchronous with status of a state machine of the transmitting end in the current period of time. After the state machine of the transmitting end 1301 is synchronous with a state machine of the receiving end 1304, the status of the state machine of the receiving end 1301 varies with the unit time as the status of the state machine of the transmitting end 1301.

The receiving end 1304 includes a receiving unit 1302a, a status reset determiner 1302b, a pseudocode determiner 1302c, and a decoder 1302d.

The receiving unit 1302a receives the visible light signal transmitted by the transmitting end 1301, and converts the visible light signal into a digital signal.

The status reset determiner 1302b connected to the receiving unit 1302a is configured to decompose the digital signal, which is obtained through conversion by the receiving unit, into a reset code part, a status indication code part, and an ID part, and compares the reset code with a set specific value; and when a condition is matched, determine that the received visible light signal is a status reset signal, and output, to the pseudocode determiner 1302c, an instruction for adjusting status of a state machine to a state indicated by the status reset signal. The instruction herein includes a status indication code part and an ID part; and when the condition is not matched, the encrypted pilot optical signal and the encrypted original signal are output.

The pseudocode determiner 1302c connected to the status reset determiner 1302b is configured to, when an instruction sent by the status reset determiner 1302b is received, adjusts the status of the state machine to a state indicated by the instruction. When the encrypted pilot optical signal is received, the pseudocode determiner performs a logical operation on the encrypted pilot optical signal with a pre-stored pseudocode signal corresponding to a state machine of all users in a photonic Internet of Things system in the current period of time, for example, after a convolution operation, determines a pseudocode signal corresponding to current status according to relevant peaks.

The decoder 1302d, which is connected to the status reset determiner 1302b and the pseudocode determiner 1302c, is configured to use the pseudocode signal output by the pseudocode determiner 1302c to decrypt the encrypted original signal, which is output by the status reset determiner 1302b, to obtain an original signal. In a specific implementation process, the decoder 1302d has a buffering function, which is used to buffer the encrypted original signal output by the decomposing unit 1302b, or a buffering unit is connected between the decomposing unit 1302b and the decoder 1302d and configured to buffer the encrypted original signal output by the status reset determiner 1302b.

In a specific implementation process, an ID determiner connected to the decoder 1302d, and a specific device connected to the determiner, for example, a door lock, a household appliance, or the like may further be included.

Embodiment 14

Figure 14:
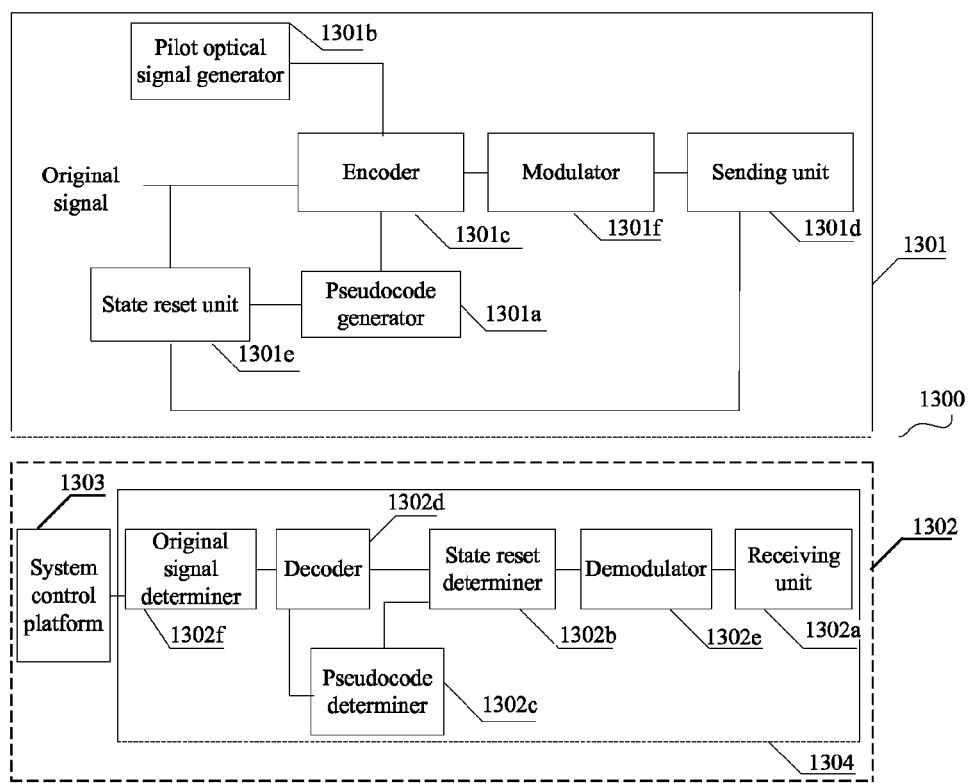
FIG. 14 is a schematic structural diagram of a handshake synchronization restoration system according to Embodiment 14 of the disclosure.

Referring to FIG. 14, FIG. 14 is a schematic structural diagram of a handshake synchronization restoration system according to Embodiment 14 of the disclosure. Compared with Embodiment 13, the transmitting end 1301 further includes:

a modulator 1301f, connected between the encoder 1301c and the sending unit 1301d, and configured to modulate the scrambled signal.

Correspondingly, the receiving end 1302 further includes:

a demodulator 1302e, connected between the receiving unit 1302a and the status reset determiner 1302b, and configured to demodulate the digital signal output by the receiving unit 1302a.

Further, the receiving end 1302 further includes:

an original signal determiner 1302f, connected to the decoder 1302d and the pseudocode determiner 1302c, and configured to compare a decrypted original signal with an original signal prestored in the pseudocode determiner and determine legality of a received original signal. In a specific implementation process, the original signal determiner 1302f has a buffering function, which is used to buffer an original signal output by the pseudocode determiner 1302c, or a buffer may be connected between the pseudocode determiner 1302c and the original signal determiner 1302f, and the original signal output by the pseudocode determiner 1302c by using the buffer.

In a specific implementation process, the synchronization system 1300 further includes a functional unit connected to the receiving unit 1302a, for example, an electric lock, or the like.

Embodiment 15

Figure 15:
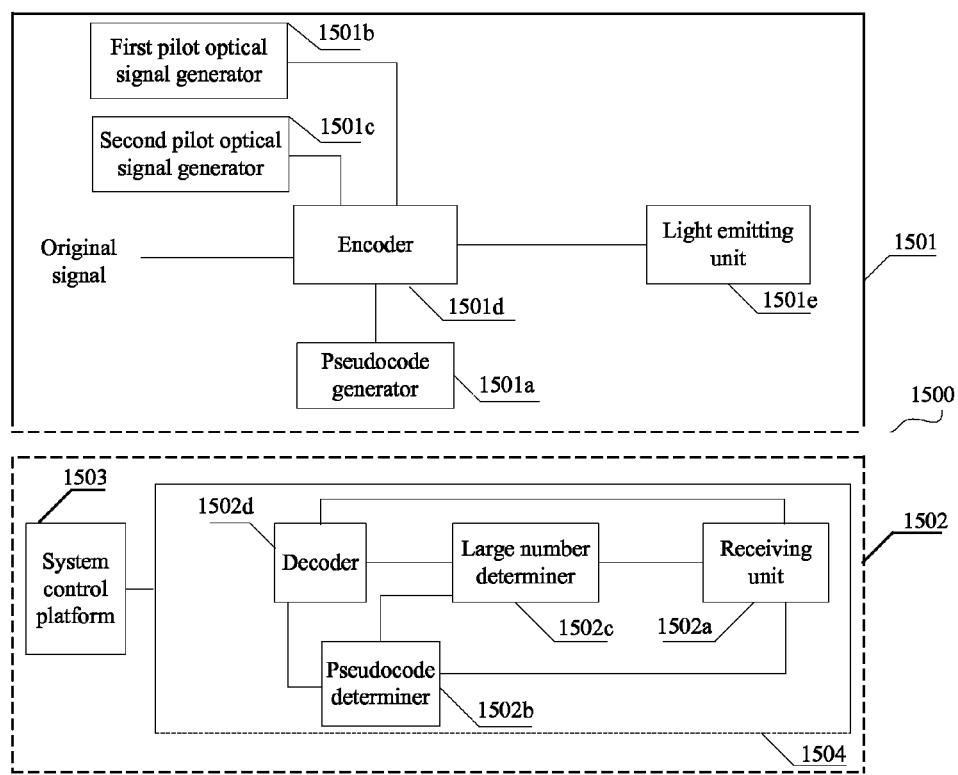
FIG. 15 is a schematic structural diagram of a handshake synchronization restoration system according to Embodiment 15 of the disclosure.

Referring to FIG. 15, FIG. 15 is a schematic structural diagram of a handshake synchronization restoration system according to Embodiment 15 of the disclosure. The system 1500 includes a transmitting end 1501 and a receive and control system 1502. The transmitting end 1501 includes a pseudocode generator 1501a, a first pilot optical signal generator 1501b, a second pilot optical signal generator 1501c, an encoder 1501d, and a light emitting unit 1501e. The receive and control system 1502 includes a system control platform 1503, and at least one receiving end 1504 connected to the system control platform 1503.

The pseudocode generator 1501a is configured to generate and output a pseudocode signal that varies with a pilot optical signal 1. Working status of the pseudocode generator 1501a varies with the pilot optical signal 1, and the output pseudocode signal also varies with the pilot optical signal 1. For example, when the pilot optical signal 1 is 00000001, the status of the pseudocode generator 1501a is a state 1, and the output pseudocode signal is 11101001110100111010001001001101; and when the pilot optical signal 1 is 00000002, the status of the pseudocode generator 1501a is a state 2, and the output pseudocode signal is 10101101010100101011001101011010.

The first pilot optical signal generator 1501b is configured to generate and output the pilot optical signal 1 that varies with time, where the pilot optical signal 1 is a binary number of multiple bits, for example, a 8-bit binary number: 00000001.

The second pilot optical signal generator 1501c is configured to generate and output a pilot optical signal 2 that varies with time, where the pilot optical signal 2 is large numbers in ascending order or in descending order, and the large numbers are not cyclic in a preset period of time, for example, does not in 20 years.

The encoder 1501d, which is connected to the first pilot optical signal generator 1501b, the second pilot optical signal generator 1501c, and the pseudocode generator 1501a, is configured to perform a logical operation on an original signal and a pilot optical signal, which is output by the first pilot optical signal generator 1501b and the second pilot optical signal generator 1501c, separately with a pseudocode signal output by the pseudocode generator 1501a in the current period of time to obtain an encrypted original signal and an encrypted pilot optical signal; and combines the encrypted original signal and the encrypted pilot optical signal to obtain the scrambled signal. For example, an encrypted original signal 11101001110100111010001001001011 is combined with a first encrypted pilot optical signal 00010110 and a second encrypted pilot optical signal 0010110001011101101110010 to obtain the scrambled signal:

11101001110100111010001001001011000101100010110001011 000101110110110010.

Herein, the first 32 bits are an encrypted original signal and the last 32 bits are a first encrypted pilot optical signal and a second encrypted pilot optical signal for combination. In a specific process, it may also be that the first 32 bits are an encrypted pilot optical signal and the last 32 bits are an encrypted original signal.

The light emitting unit 1501e connected to the encoder 1501d is configured to send, in the form of a visible light signal, the scrambled signal output by the encoder 1501d. The light emitting unit 1501e may be a light emitting diode, and may also be another component that has a light emitting function.

The transmitting end 1501 may be a dedicated photon client, a mobile phone, or another handheld electronic device that has a function of transmitting a visible light signal.

The receiving end 1504 includes a receiving unit 1502a, a pseudocode determiner 1502b, a large number determiner 1502c, and a decoder 1502d.

The receiving unit 1502a receives the visible light signal transmitted by the transmitting end 1501, and converts the visible light signal into a digital signal.

The pseudocode determiner 1502b connected to the receiving unit 1502a is configured to decompose the digital signal, which is obtained through conversion by the receiving unit 1302a, into an encrypted original signal and an encrypted pilot optical signal. When an encrypted pilot optical signal is received, this pseudocode determiner performs a logical operation on the encrypted pilot optical signal with a pre-stored pseudocode signal corresponding to a state machine of all users in a photonic Internet of Things system in the current period of time, for example, after convolution operation, determines a pseudocode signal corresponding to current status according to a decrypted pilot optical signal 1; if the decrypted pilot optical signal 1 is consistent with status of a current pseudocode signal, proceeds to work; otherwise, reports an error and exits.

The large number determiner 1502c, which is connected to the receiving unit 1502a and the pseudocode determiner 1502b, is configured to use the pseudocode signal output by the pseudocode determiner 1502b to decrypt the encrypted pilot optical signal output by the 1502a to obtain a decrypted pilot optical signal 2, compare the pilot optical signal 2 with a large number in the large number determiner 1502c; if the decrypted pilot optical signal 2 is greater than the large number in the current 1502c, save the decrypted pilot optical signal 2, and proceed to work; otherwise, report an error and exit.

The decoder 1502d, which is connected to the receiving unit 1502a, the pseudocode determiner 1502b, and the large number determiner 1502c, is configured to use the pseudocode signal output by the pseudocode determiner 1502c to decrypt the encrypted original signal output by the 1502a to obtain an original signal. In a specific implementation process, the decoder 1502d has a buffering function, which is used to buffer an encrypted original signal output by the decomposing unit 1502a.

In a specific implementation process, an ID determiner connected to the decoder 1502d, and a specific device connected to the determiner, for example, a door lock, a household appliance, or the like may further be included.

The foregoing describes the embodiments of the disclosure in detail. In this specification, specific examples are used to describe the principles and implementations of the disclosure, and the description of the embodiments is only intended to make the method and core idea of the disclosure more comprehensible. In addition, a person of ordinary skill in the art may, based on the idea of the disclosure, make modifications with respect to the specific implementations and the application scope. Therefore, the content of this specification shall not be construed as a limitation to the disclosure.

What is claimed is:

1. A handshake synchronization method for a visible light signal, comprising:
   connecting, by a transmitting end, in which a state machine varies with unit time, to a receiving end, and adjusting, by the receiving end, the status of a state machine of the receiving end to be synchronous with the status of the state machine of the transmitting end in the current period of time;
   by a processor of the transmitting end, a logical operation on an original signal and a pilot optical signal separately with a pseudocode signal of the current period of time to obtain an encrypted original signal and an encrypted pilot optical signal, combining the encrypted original signal and the encrypted pilot optical signal to obtain a scrambled signal, and sending the scrambled signal in a form of a visible light signal; and
   receiving, by the receiving end, the visible light signal, and converting the visible light signal into a digital signal and then performing decomposition to obtain an encrypted original signal and an encrypted pilot optical signal; after inverting the encrypted pilot optical signal, comparing the inverted encrypted pilot optical signal with a pseudocode signal corresponding to a current status; and if the inverted encrypted pilot optical signal is the same as the pseudocode signal corresponding to the current status, using the pseudocode signal corresponding to the current status to decrypt the encrypted original signal.

2. The handshake synchronization method according to claim 1, wherein the state machine provides large numbers in ascending order or in descending order and the large numbers are not cyclic in a preset period of time.

3. The handshake synchronization method according to claim 2, wherein the pilot optical signal comprises a pilot optical signal 1 and a pilot optical signal 2, and before connecting, by the transmitting end, in which the state machine varies with unit time, to the receiving end, the method further comprises:
   setting, by the transmitting end, a structure of the logical operation for each user: a first layer, wherein the pilot optical signal 1 represents a different user and is encrypted by using a static encryption algorithm; and a second layer, wherein the pilot optical signal 2 is status of a state machine of a unique dynamic encryption algorithm of the user represented by the pilot optical signal 1;
   setting, by the receiving end, a structure of a corresponding logical operation: a first layer, wherein an encrypted signal of the pilot optical signal 1 is decrypted by using the static encryption algorithm, and there is a table that corresponds to decrypted information, so that the user can be found; and a second layer, wherein ever-changing state machine information of the user is found by using information about the pilot optical signal 2.

4. The handshake synchronization method according to claim 3, wherein after setting, by the transmitting end, the structure of the logical operation for each user, the method further comprises:
   setting a third layer, wherein the state machine corresponds to the dynamic encryption algorithm of the user; and
   after setting, by the receiving end, the structure of the corresponding logical operation, the method further comprises:

setting a third layer, wherein a scrambling code of a dynamic encryption algorithm sequence of the user at this moment is found according to transition of a state machine, and ID information of the user is decrypted by using the scrambling code.

5. The handshake synchronization method according to claim 3, wherein adjusting, by the receiving end, the status of the state machine of the receiving end to be synchronous with the status of the state machine of the transmitting end comprises:
   allocating, by a system, an exclusive ID, a dynamic encryption algorithm, and a state machine for a user corresponding to the receiving end, and enabling a start bit of a state machine of the system to be the same as that of an end user at a first interconnection moment; and
   if the end user has lost synchronization with the system, re-interconnecting, by the end user, with the system, so that the start bit that is of the state machine of the user and stored in the system is the same as that of the state machine of the end user.

6. The handshake synchronization method according to claim 1, further comprising: controlling, by the receiving end if determining that the received original signal is legal, an action of a functional unit connected to the receiving end.

7. The handshake synchronization method according to claim 1, wherein before sending the scrambled signal in the form of the visible light signal, the method further comprises: modulating the scrambled signal.

8. The handshake synchronization method according to claim 7, wherein after receiving, by the receiving end, the visible light signal, the method further comprises: demodulating the digital signal.

9. The handshake synchronization method according to claim 1, wherein frequencies of the original signal, the pilot optical signal, and the pseudocode signal are the same or in an integer multiple relationship, and start and end phases of the original signal, the pilot optical signal, and the pseudocode signal are the same.

10. A handshake synchronization method based on visible light communication, comprising:
    connecting, by a transmitting end, in which a state machine varies with unit time, to a receive and control system, and adjusting, by the receive and control system, status of a state machine of the receive and control system to be synchronous with status of the state machine of the transmitting end, wherein the receive and control system comprises one or multiple receiving ends;
    by a processor of the transmitting end, a logical operation on an original signal and a pilot optical signal separately with a pseudocode signal of the current period of time to obtain an encrypted original signal and an encrypted pilot optical signal, combining the encrypted original signal and the encrypted pilot optical signal to obtain the scrambled signal, and sending the scrambled signal in the form of a visible light signal; and
    receiving, by the receive and control system, the visible light signal, and converting the visible light signal into a digital signal and then performing decomposition to obtain an encrypted original signal and an encrypted pilot optical signal; performing a logical operation on the encrypted pilot optical signal with a prestored pseudocode signal corresponding to a state machine of all users in the current period of time, and identifying a pseudocode signal corresponding to the pilot optical signal in the current status according to relevant peaks; and using the pseudocode signal corresponding to the current status to decrypt the encrypted original signal.

11. The handshake synchronization method according to claim 10, wherein the method further comprises:
    comparing, by the receive and control system, a decrypted original signal with a prestored original signal, and determining legality of a received original signal.

12. The handshake synchronization method according to claim 11, wherein the method further comprises:
    controlling, by the receive and control system if determining that the received original signal is legal, an action of a functional unit connected to the receive and control system.

13. The handshake synchronization method according to claim 10, wherein before the sending the scrambled signal in the form of a visible light signal, the method further comprises: modulating the scrambled signal.

14. The handshake synchronization method according to claim 13, wherein after the receiving, by the receive and control system, the visible light signal, the method further comprises:
    demodulating the digital signal.

15. The handshake synchronization method according to claim 10, wherein frequencies of the original signal, the pilot optical signal, and the pseudocode signal are the same or in an integer multiple relationship, and start and end phases of the original signal, the pilot optical signal, and the pseudocode signal are the same.

* * * * *